United States Patent [19]

Wunderlich et al.

[11] Patent Number: 4,665,179
[45] Date of Patent: May 12, 1987

[54] TRIPHENDIOXAZINE DYESTUFFS

[75] Inventors: Klaus Wunderlich; Wolfgang Harms, both of Leverkusen; Karl J. Herd, Odenthal; Horst Jäger, Leverkusen, all of Fed. Rep. of Germany

[73] Assignee: Bayer Aktiengesellschaft, Leverkusen, Fed. Rep. of Germany

[21] Appl. No.: 839,766

[22] Filed: Mar. 14, 1986

[30] Foreign Application Priority Data

Mar. 23, 1985 [DE] Fed. Rep. of Germany ....... 3510612

[51] Int. Cl.$^4$ ..................... C07D 265/38; C09B 19/02
[52] U.S. Cl. ......................................... 544/76; 544/75
[58] Field of Search .................................. 544/75, 76

[56] References Cited

U.S. PATENT DOCUMENTS

| | | | |
|---|---|---|---|
| 3,883,523 | 5/1975 | Parton | 260/246 R |
| 3,892,742 | 7/1975 | Parton | 260/246 R |
| 4,400,504 | 8/1983 | Harms et al. | 544/76 |
| 4,588,810 | 5/1986 | Harms et al. | 544/76 |

FOREIGN PATENT DOCUMENTS

| | | |
|---|---|---|
| 0101665 | 2/1984 | European Pat. Off. . |
| 1368158 | 9/1974 | United Kingdom . |
| 1450746 | 9/1976 | United Kingdom . |
| 1477071 | 6/1977 | United Kingdom . |
| 1559752 | 1/1980 | United Kingdom . |

Primary Examiner—Richard L. Raymond
Attorney, Agent, or Firm—Sprung Horn Kramer & Woods

[57] ABSTRACT

Dyestuffs of the formula

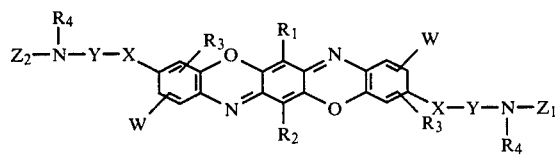

with the substituent meanings mentioned in the description, are suitable for dyeing and printing hydroxyl- and amido-containing textile materials. To prepare these dyestuffs, new intermediates of the formula

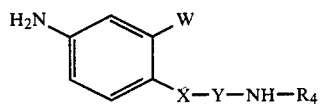

are used.

8 Claims, No Drawings

TRIPHENDIOXAZINE DYESTUFFS

The present invention relates to dyestuffs of the formula

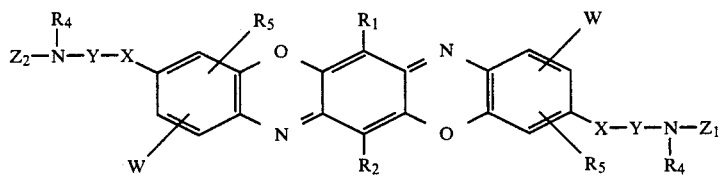

wherein
$R_1-R_4 =$ H or substituent
$X_4 =$

O
$R_5 =$ H or optionally substituted $C_1-C_6$-alkyl, cycloalkyl, aryl or aralkyl,
Y = bridge member,
$Z_1, Z_2 =$ H or fibre-reactive radical,
W = non-fibre-reactive sulphonyl radical, in particular alkyl, aralkyl, cycloalkyl or arylsulphonyl radical, preferably a radical $-SO_2Q$ where
Q = $C_2$-alkyl optionally substituted by $SO_3H$, COOH, carboxamide, sulphonamide, $C_1-C_4$-alkoxy or optionally substituted $C_1$- or $C_3-C_6$-alkyl, cycloalkyl, aralkyl, aryl, where aryl preferably stands for optionally substituted phenyl and aralkyl preferably for optionally substituted phenyl-$C_1-C_4$-cycloalkyl.

Suitable substituents in $C_1$- or $C_3-C_6$-alkyl, cycloalkyl, aralkyl, aryl are for example $SO_3H$, $OSO_3H$, $S-SO_3H$, COOH, optionally substituted carboxamide, $-COO-C_1-C_4$-alkyl, CN, $-PO_3H_2$, $-OPO_3H_2$, $-O-CO-C_1-C_4$-alkyl, OH, $C_1-C_4$-alkoxy, $-(CH_2-CH_2-O)_{1-4}-CH_2-CH_2OH$, $-(CH_2-CH_2-O)_{1-4}-CH_2-CH_2-OSO_3H$, halogen.

Suitable radicals $R_1$, $R_2$ are in addition to hydrogen for example Cl, Br, $C_1-C_4$-alkyl, aryl, $C_1-C_4$-alkoxy, aryloxy in particular optionally substituted phenyl and phenoxy, acylamino, in particular acetylamino and benzoylamino, carboxyl, optionally further substituted carboxamide.

Suitable radicals $R_3$ are in addition to hydrogen for example $C_1-C_4$-alkyl, Cl, Br, $C_1-C_4$-alkoxy, sulpho, carboxyl.

Suitable radicals $R_4$ are for example H, optionally $SO_3H-$, $OSO_3H-$, COOH—, $OPO_3H_2-$, OH-substituted $C_1-C_4$-alkyl, cyclohexyl, phenyl, sulphophenyl.

Bridge members Y are for example:
alkylene radicals such as $C_2-C_6$-alkylene, optionally interrupted by O, S or N, optionally substituted, for example ethylene, 1,2- and 1,3-propylene, 1,2-, 1,3-, 1,4- and 2,3-butylene, 2-methyl-1,3-propylene, 2,2-dimethylpropylene, 2-methyl-2,4-pentylene, 1-phenylethylene, 2,5-hexylene, 1,5-pentylene, 1,6-hexylene, 1,3-cyclohexylene, 1,4-cyclohexylene, 4-methyl-1,3-cyclohexylene, 2-hydroxy-1,3-propylene, 2-sulphato-1,3-propylene, $-CH_2-CH_2-O-CH_2-CH_2-$, $-CH_2-CH_2-S-CH_2-CH_2$, $-CH_2-CH_2-NH-CH_2-CH_2-$,

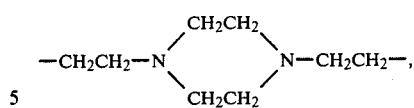

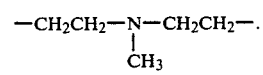

aralkylene radicals such as

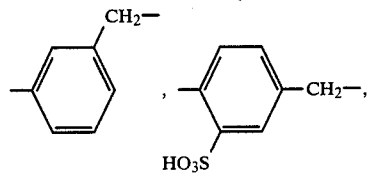

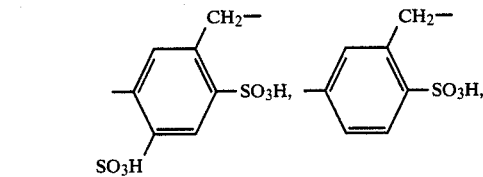

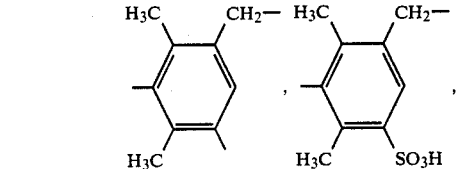

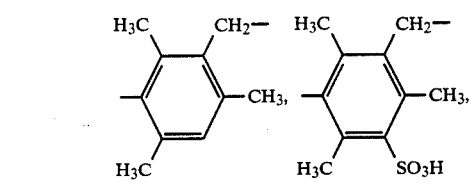

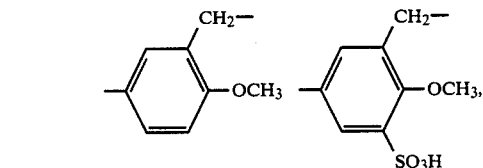

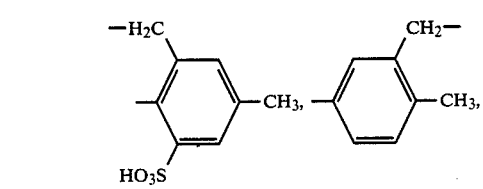

-continued

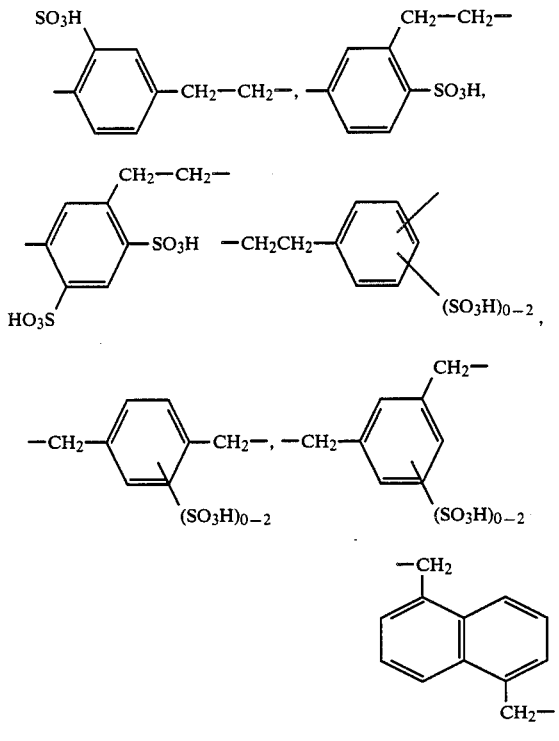

and the radical

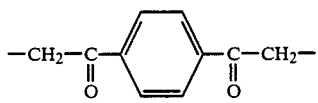

Suitable bridge members Y are also arylene radicals such as optionally substituted phenylene, in particular phenylene and alkyl-, alkoxy-, sulpho-, carboxyl- or halogen-substituted phenylene such as 1,2-, 1,3-, 1,4-phenylene, 3-methyl-1,2-phenylene, 4-methyl-1,2-phenylene, 2-methyl-1,3-phenylene, 4-methyl-1,3-phenylene, 5-methyl-1,3-phenylene, 2-methyl-1,4-phenylene, 2,4,6-trimethyl-1,3-phenylene, 2,3,5,6-tetramethyl-1,4-phenylene, 2,6-dimethyl-1,3-phenylene, 2-methyl-6-ethyl-1,3-phenylene, 2-methyl-4,6-diethyl-1,3-phenylene, 2,6-diethyl-4-methyl-1,3-phenylene, 2-methoxy-1,3-phenylene, 4-methoxy-1,3-phenylene, 6-methoxy-1,3-phenylene, 2-methoxy-1,4-phenylene, 4-chloro-1,3-phenylene, 2-chloro-1,4-phenylene, such as in particular the stated arylene radicals substituted by 1–2 sulpho groups, such as, for example, 4-sulpho-1,2-phenylene, 4-sulpho-1,3-phenylene, 3-sulpho-1,4-phenylene, 2-sulpho-1,4-phenylene, 4,6-disulpho-1,3-phenylene, 2,5-disulpho-1,4-phenylene, 2-methyl-5-sulpho-1,3-phenylene, 2-methyl-4-sulpho-1,3-phenylene, 2,4,6-trimethyl-5-sulpho-1,3-phenylene, 2,6-dimethyl-4- and -5-sulpho-1,3-phenylene, 2-methyl-6-sulpho-1,3-phenylene, 4-methyl-6-sulpho-1,3-phenylene, 6-methyl-4-sulpho-1,3-phenylene, 3-methyl-6-sulpho-1,4-phenylene, 6-methoxy-4-sulpho-1,3-phenylene, 4-methoxy-6-sulpho-1,3-phenylene.

Suitable radicals Q are for example methyl, ethyl, propyl, butyl, pentyl, hexyl, allyl and the sulpho-, sulphamoyl-, carboxyl-, carbamoyl-, yloxycarbonyl-, cyano-, keto-, $C_1$–$C_4$-alkoxy-, aroxy-substituted $C_1$–$C_6$-alkyl groups such as $CH_2$—COOH, —$CH_2$—COO-alkyl, —$CH_2$—$CONH_2$, —$CH_2$—CN, —$CH_2$—CO-alkyl,

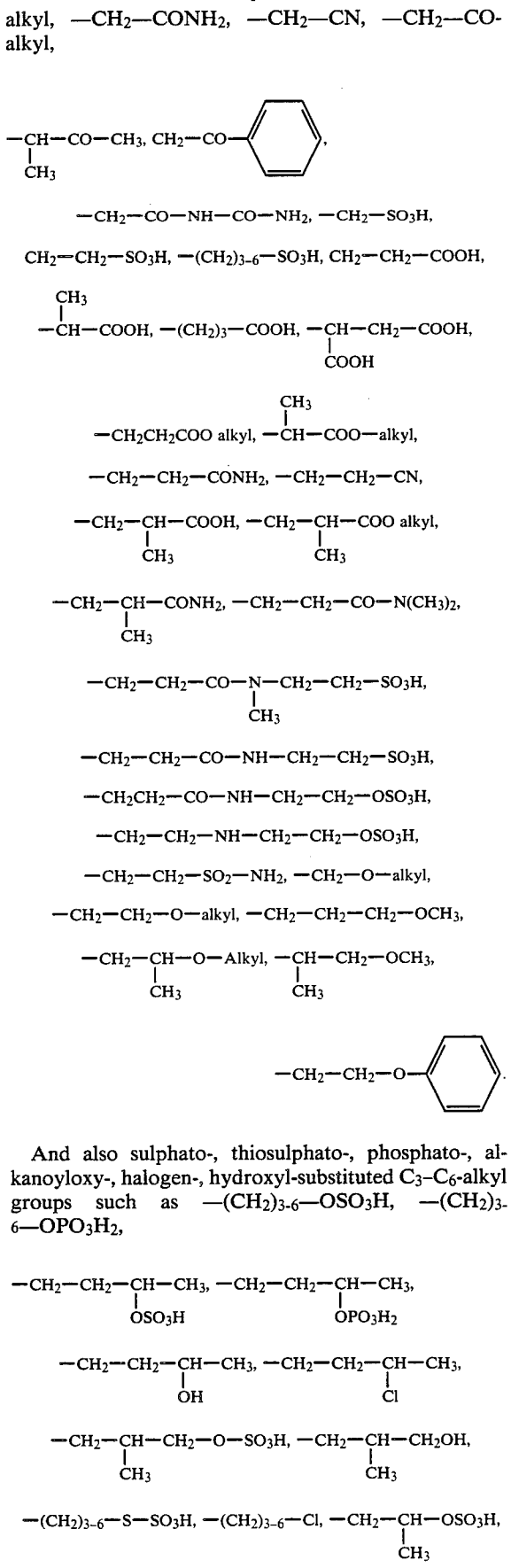

And also sulphato-, thiosulphato-, phosphato-, alkanoyloxy-, halogen-, hydroxyl-substituted $C_3$–$C_6$-alkyl groups such as —$(CH_2)_{3-6}$—$OSO_3H$, —$(CH_2)_{3-6}$—$OPO_3H_2$, -continued

—CH(CH₃)—CH₂—OSO₃H,  —CH₂—CH(CH₃)—OPO₃H₂,

—CH(CH₃)—CH₂—OPO₃H₂,  —CH₂—CH(CH₃)—S—SO₃H,

—CH(CH₃)—CH₂—S—SO₃H,  —CH₂—CH(CH₃)—OH,  —CH(CH₃)—CH₂—OH,

—CH₂—CH(CH₃)—OCOCH₃,  —CH(CH₃)—CH₂—OCOCH₃,

—CH₂—CH(CH₃)—Cl,  —CH(CH₃)—CH₂—Cl,  —CH₂—CH(CH₃)—Br,

—CH(CH₃)—CH₂—Br and also sulpho-, sulphato-, carboxyl-substituted aryl-$C_1$-$C_4$-alkyl radicals such as benzyl, o-, m-, p-sulphobenzyl, 2-phenyl-2-sulphatoethyl, o-, m-, p-carboxybenzyl, 1- or 2-phenylethyl and the corresponding phenyl-sulphonated radicals, 2- and 3-phenyl-1-propyl, 4-phenyl-2-butyl and the corresponding phenyl-sulphonated radicals, naphthylmethyl, 5-, 6-, 7- or 8-sulphonaphthyl-1-methyl, 5-, 6-, 7- or 8-sulphonaphthyl-1-methyl and also alkyl and aralkyl radicals which are interrupted by hetero atoms O, S and N and optionally substituted by sulpho, sulphato, carboxyl, hydroxyl, $C_1$-$C_4$-alkoxy, halogen, such as —(CH₂)₄—O—(CH₂)₄—Cl,  CH₂—CH₂—O—C₆H₅,

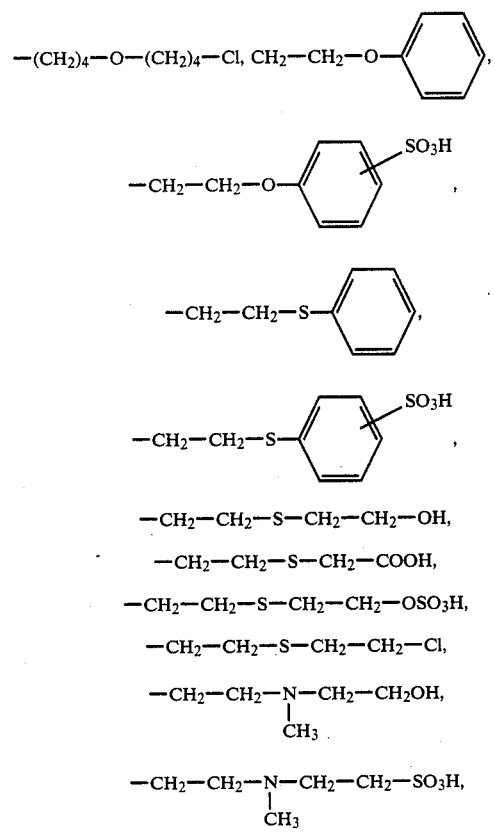

—CH₂—CH₂—S—CH₂—CH₂—OH,

—CH₂—CH₂—S—CH₂—COOH,

—CH₂—CH₂—S—CH₂—CH₂—OSO₃H,

—CH₂—CH₂—S—CH₂—CH₂—Cl,

—CH₂—CH₂—N(CH₃)—CH₂—CH₂OH,

—CH₂—CH₂—N(CH₃)—CH₂—CH₂—SO₃H,

—CH₂—CH₂—N(CH₃)—CH₂—CH₂—OSO₃H,

—CH₂—CH₂—NH—CH₂—CH₂OH,

—CH₂—CH₂—NH—CH₂—CH₂—OSO₃H,

—CH₂—CH₂—NH—CH₂—CH₂—SO₃H,

—CH₂—CH₂—N(CH₃)—CH₂—CH₂OH,

—CH₂—CH₂—N(CH₃)—CH₂—CH₂—SO₃H,

—CH₂—CH₂—N(CH₃)—CH₂—CH₂—OSO₃H,

—CH₂—CH₂—N(CH₂CH₂OH)—CH₂—CH₂OH,

—CH₂—CH₂—N(CH₂CH₂—OSO₃H)—CH₂—CH₂—OSO₃H,

—CH₂—CH₂—NH—CH₂—COOH,

—CH₂—CH₂—N(CH₃)—CH₂—COOH,

—CH₂—CH₂—N(C₂H₅)—CH₂—CH₂OH,  —CH₂—CH₂—N(C₂H₅)—CH₃,

—CH₂—CH₂—NH—CH₂—CH₂—OPO₃H₂,

—CH₂—CH₂—N(CH₃)—CH₂—CH₂—OPO₃H₂,

—CH₂—CH₂—NH—CH₂—CH₂—S—SO₃H and also aryl radicals in particular optionally substituted phenyl or naphthyl radicals such as phenyl, 2-, 3-, 4-sulphophenyl, carboxyphenyl, methylphenyl, chlorophenyl, $C_1$-$C_4$-alkoxyphenyl, 5-, 6-, 7-, 8-sulpho-1-naphthyl, 5-, 6-, 7-, 8-sulpho-2-naphthyl, 5,7-disulpho-1-naphthyl, 6,8-disulpho-2-naphthyl.

Preferably $R_1$ and $R_2$ stand for Cl and $R_3$ stands for H.

Examples of suitable fibre-reactive radicals Z, that is to say those which react with materials containing hydroxyl groups or amide groups under dyeing conditions and form a covalent bond, are those which contain at least one detachable substituent bonded to a heterocyclic or aliphatic radical, in particular those which contain at least one reactive substituent bonded to a 5-membered or 6-membered heterocyclic ring, such as to a monoazine, diazine or triazine ring, for example a pyridine, pyrimidine, pyridazine, pyrazine, thiazine, oxazine or asymmetric or symmetric triazine ring, or to a ring system of this type which contains one or more fused-on aromatic rings, such as a quinoline, phthalazine, quinazoline, quinoxaline, acridine, phenazine or phenanthridine ring system; the 5-membered or 6-membered heterocyclic rings, which contain at least one reactive substituent, are accordingly preferably those which contain one or more nitrogen atoms and can contain 5-membered or, preferably, 6-membered fused-on carbocyclic rings.

Examples which may be mentioned of the reactive substituents on the heterocycle are: halogen (Cl, Br or F), ammonium, including hydrazinium, sulphonium, sulphonyl, azido (—N$_3$), thiocyanato, thio, thioether, oxyether, sulphinic acid and sulphonic acid. Specific examples which may be mentioned are: mono- or dihalogeno-symmetric-triazinyl radicals, for example 2,4-dichlorotriazin-6-yl, 2-amino-4-chlorotriazin-6-yl, 2-alkylamino-4-chlorotriazin-6-yl, such as 2-methylamino-4-chlorotriazin-6-yl, 2-ethylamino- or 2-propylamino-4-chlorotriazin-6-yl, 2-β-hydroxyethylamino-4-chlorotriazin-6-yl, 2-di-β-hydroxyethylamino-4-chlorotriazin-6-yl and the corresponding sulphuric acid half-esters, 2-diethylamino-4-chlorotriazin-6-yl, 2-morpholino- or 2-piperidino-4-chlorotriazin-6-yl, 2-cyclohexylamino-4-chlorotriazin-6-yl, 2-arylamino- and substituted arylamino-4-chlorotriazin-6-yl, such as 2-phenylamino-4-chlorotriazin-6-yl, 2-(o-, m- or p-carboxy- or -sulphophenyl)-amino-4-chlorotriazin-6-yl and 2-(2',4'-2',5'- or 3',4'-disulphophenyl)-amino-4-chlorotriazin-6-yl, 2-alkoxy-4-chlorotriazin-6-yl, such as 2-methoxy- or -ethoxy-4-chlorotriazin-6-yl, 2-(phenyl-sulphonylmethoxy)-4-chlorotriazin-6-yl, 2-aryloxy- and substituted aryloxy-4-chlorotriazin-6-yl, such as 2-phenoxy-4-chlorotriazin-6-yl, 2-(p-sulphophenyl)-hydroxy-4-chlorotriazin-6-yl, 2-(o-, m- or p-methyl- or -methoxyphenyl)-hydroxy-4-chlorotriazin-6-yl, 2-alkylmercapto- or 2-arylmercapto- or 2-(substituted aryl)-mercapto-4-chlorotriazin-6-yl, such as 2-β-hydroxyethylmercapto-4-chlorotriazin-6-yl, 2-phenylmercapto-4-chlorotriazin-6-yl, 3-(4'-methylphenyl)-mercapto-4-chlorotriazin-6-yl, 2-(2',4'-dinitro)-phenyl-mercapto-4-chlorotriazin-6-yl, 2-methyl-4-chlorotriazin-6-yl, 2-phenyl-4-chlorotriazin-6-yl, 2,4-difluorotriazin-6-yl, monofluorotriazinyl radicals which are substituted by amino, alkylamino, aralkylamino or arylamino groups, alkyl denoting, in particular, optionally substituted C$_1$–C$_4$-alkyl, aralkyl denoting, in particular, optionally substituted phenyl-C$_1$–C$_4$-alkyl and aryl denoting, in particular, phenyl or naphthyl which is optionally substituted by sulpho, alkyl, in particular C$_1$–C$_4$-alkyl, alkoxy, in particular C$_1$–C$_4$-alkoxy, carboxylic acid or acylamino groups and halogen atoms, such as fluorine, chlorine or bromine, for example 2-amino-4-fluorotriazin-6-yl, 2-methylamino-4-fluorotriazin-6-yl, 2-ethylamino-4-fluorotriazin-6-yl, 2-isopropylamino-4-fluorotriazin-6-yl, 2-dimethylamino-4-fluorotriazin-6-yl, 2-diethylamino-4-fluorotriazin-6-yl, 2-β-methoxy-ethylamino-4-fluorotriazin-6-yl, 2-β-hydroxyethylamino-4-fluorotriazin-6-yl, 2-di-(β-hydroxyethylamino)-4-fluorotriazin-6-yl, 2-β-sulphoethylamino-4-fluorotriazin-6-yl, 2-β-sulphoethylmethylamino-4-fluorotriazin-6-yl, 2-carboxymethylamino-4-fluorotriazin-6-yl, 2-β-cyanoethylamino-4-fluorotriazin-6-yl, 2-benzylamino-4-fluorotriazin-6-yl, 2-β-phenylethylamino-4-fluorotriazin-6-yl, 2-benzylmethylamino-4-fluorotriazin-6-yl, 2-(x-sulphobenzyl)-amino-4-fluorotriazin-6-yl, 2-cyclohexylamino-4-fluorotriazin-6-yl, 2-(o-, m- or p-methylphenyl)-amino-4-fluorotriazin-6-yl, 2-(o-, m- or p-sulphophenyl)-amino-4-fluorotriazin-6-yl, 2-(2',5'-disulphophenyl)-amino-4-fluorotriazin-6-yl, 2-(o-, m- or p-chlorophenyl)-amino-4-fluorotriazin-6-yl, 2-(o-, m- or p-methoxyphenyl)-4-fluorotriazin-6-yl, 2-(2'-methyl-4'-sulphophenyl)-amino-4-fluorotriazin-6-yl, 2-(2'-methyl-5'-sulphophenyl)-amino-4-fluorotriazin-6-yl, 2-(2'-chloro-4'-sulphophenyl)-amino-4-triazin-6-yl, 2-(2'-chloro-5'-sulphophenyl)-amino-4-triazin-6-yl, 2-(2'-methoxy-4'-sulphophenyl)-amino-4-fluorotriazin-6-yl, 2-(o-, m- or p-carboxyphenyl)-amino-4-fluorotriazin-6-yl, 2-(2',4'-disulphophenyl)-amino-4-fluorotriazin-6-yl, 2-(3',5'-disulphophenyl)-amino-4-fluorotriazin-6-yl, 2-(2'-carboxy-4-sulphophenyl)-amino-4-fluorotriazin-6-yl, 2-(6'-sulphonaphth-2'-yl)-amino-4-fluorotriazin-6-yl, 2-(4',8'-disulphonaphth-2'-yl)-amino-4-fluorotriazin-6-yl, 2-(6',8'-disulphonaphth-2'-yl)-amino-4-fluorotriazin-6-yl, 2-(N-methylphenyl)-amino-4-fluorotriazin-6-yl, 2-(N-ethylphenyl)-amino-4-fluorotriazin-6-yl, 2-(N-β-hydroxyethylphenyl)-amino-4-fluorotriazin-6-yl, 2-(N-isopropylphenyl)-amino-4-fluorotriazin-6-yl, 2-morpholino-4-fluorotriazin-6-yl, 2-piperidino-4-fluorotriazin-6-yl, 2-(4',6',8'-trisulphonaphth-2'-yl)-4-fluorotriazin-6-yl, 2-(3',6',8'-trisulphonaphth-2'-yl)-4-fluorotriazin-6-yl, 2-(3',6'-disulphonaphth-1'-yl)-4-fluorotriazin-6-yl, 2-chloro- or 2-fluoro-4-(4'-β-sulphatoethylsulphonylphenylamino)-6-triazinyl, 2-chloro- or 2-fluoro-4-(3'-β-sulphatoethylsulphonylphenylamino)-6-triazinyl, 2-chloro- and 2-fluoro-4-(β-(β'-sulphatoethylsulphonyl)-ethylamino)-6-triazinyl and 2-fluoro-4-bis-(β-(β'-chloroethylsulphonyl)-ethyl)-amino-6-triazinyl.

The halogenotriazinyl radicals can also be attached to a second halogenotriazinyl radical. Examples of radicals of this type are the following:

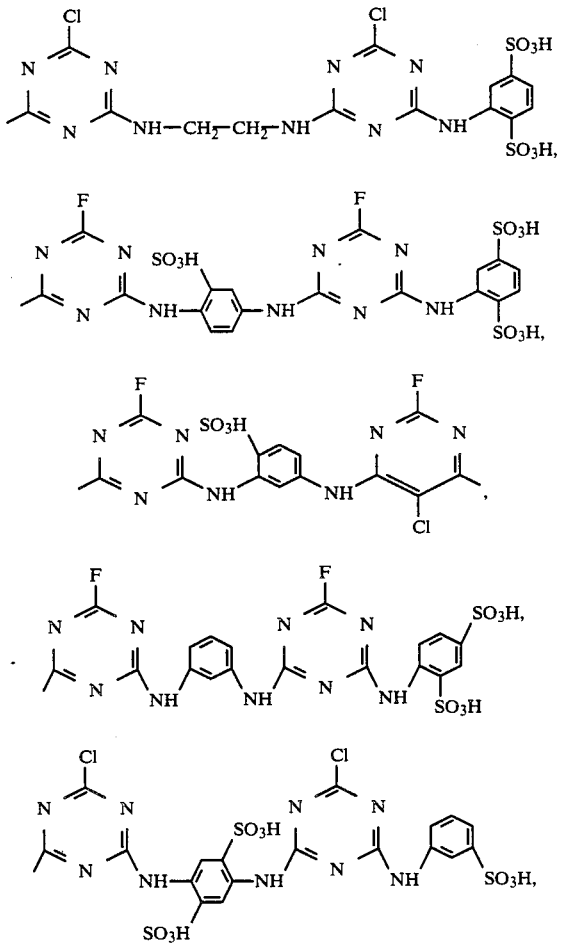

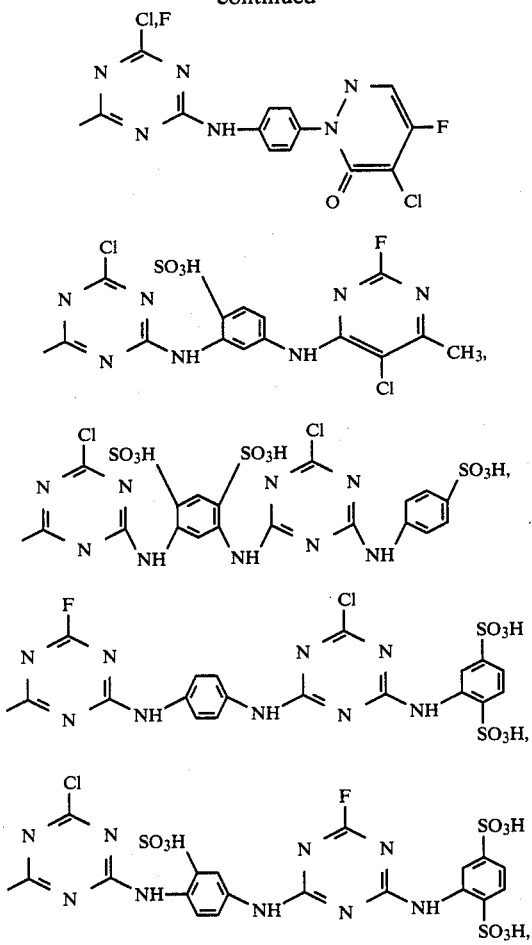

The reactive halogen atoms in the abovementioned 2-halogeno-4-substituted-triazinyl radicals can also be replaced by tertiary bases, such as trimethylamine, triethylamine, dimethyl-β-hydroxyethylamine, triethanolamine, N,N-dimethylhydrazine, pyridine, α- or ψ-picoline, nicotinic acid or isonicotinic acid, to form quaternary salts.

Mono-, di- or tri-halogenopyrimidinyl radicals, such as 2,4-dichloropyrimidin-6-yl, 2,4,5-trichloropyrimidin-6-yl, 2,4-dichloro-5-nitro-, -5-methyl-, -5-carboxymethyl-, -5-carboxy-, -5-cyano-, -5-vinyl-, -5-sulpho-, -5-mono-, -di- or -tri-chloromethyl- or -5-carboalkoxy-pyrimidin-6-yl, 2,6-dichloropyrimidine-4-carbonyl, 2,4-dichloropyrimidin-6-yl, 2,6-dichloropyrimidine-5-carbonyl, -2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloro-quinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinazoline-7- or -6-sulphonyl or -carbonyl, 2- or 3- or 4-(4′,5′-dichloro-6′-pyridazon-1′-yl)-phenylsulphonyl or -carbonyl, β-(4′,5′-dichloro-6′-pyridazon-1′-yl)-ethylcarbonyl, N-methyl-N-(2,4-dichloro-triazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl- or N-ethyl- N-(2,4-dichlorotriazin-6-yl)-aminoacetyl, N-methyl-N-(2,3-dichloroquinoxaline-6-sulphonyl)-aminoacetyl, N-methyl-N-(2,3-dichloroquinoxaline-6-carbonyl)-aminoacetyl, and the corresponding bromine and fluorine derivatives of the abovementioned chlorine-substituted radicals, and of these, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2-fluoro-5-methyl-6-chloro-4pyrimidinyl, 2-fluoro-5nitro-6-chloro-4-pyrimidinyl, 5-bromo-2-fluoro-4-pyrimidinyl, 2-fluoro-5cyano-4pyrimidinyl, 2-fluoro-5-methyl-4-pyrimidinyl, 2,5,6-trifluoro-4-pyrimidinyl, 5-chloro-6chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulphonyl-4pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimi-dinyl, 2-fluoro-6-carboxamido-4-pyrimidinyl, 2-fluoro-6-carbomethoxy-4-pyrimidinyl, 2-fluoro-6-phenyl-4-pyrimi-dinyl, 2-fluoro-6-cyano-4-pyrimidinyl, 2-fluoro-4di-chloromethyl-5-chloropyrimidin-6-yl, 2-fluoro-5-chloro-pyrimidin-4-yl, 2-methyl-4-fluoro-5-methylsulphonylpyrimidin-6-yl, 2,6-difluoro-5-methylsulphonyl-4-pyrimidinyl, 2,6-dichloro-5-methylsulphonyl-4-pyrimidinyl, 2-fluoro-5-sulphonamido-4-pyrimidinyl, 2-fluoro-5-chloro-6-carbo-methoxy-4pyrimidinyl and 2,6-difluoro-5-trifluormethyl-4-pyrimidinyl; triazine radicals containing sulphonyl groups, such as 2,4-bis-(phenylsulphonyl)-triazin-6-yl, 2-(3′-carboxyphenyl)-sulphonyl-4-chlorotriazin-6-yl, 2-(3′-sulphophenyl)-sulphonyl-4-chlorotriazin-6-yl and 2,4-bis-(3′-carboxyphenylsulphonyl)-triazin-6-yl; pyrimidine rings containing sulphonyl groups, such as 2-carboxy-methylsulphonyl-pyrimidin-4-yl, 2-methylsulphonyl-6-methyl-pyrimidin-4-yl, 2-methylsulphonyl-6-ethyl-pyrimidin-4-yl, 2-phenylsulphonyl-5-chloro-6methyl-pyrimidin-4-yl, 2,6-bis-methylsulphonyl-pyrimidin-4-yl, 2,6-bis-methylsulphonyl-5-chloro-pyrimidin-4-yl, 2,4-bis-methylsulphonyl-pyrimidine-5-sulphonyl, 2-methylsulphonyl-pyrimidin-4-yl, 2-phenylsulphonyl-pyrimidin-4-yl, 2-trichloro-methylsulphonyl-6-methyl-pyrimidin-4-yl, 2-methylsulphonyl-5-chloro-6-methyl-pyrimidin-4-yl, 2-methylsulphonyl-5-bromo-6-methyl-pyrimidin-4-yl, 2-methylsulphonyl-5chloro-6-methyl-pyrimidin-4-yl, 2-methylsulphonyl-5-bromo-6-methyl-pyrimidin-4-yl, 2-methylsulphonyl-5-chloro-6-ethyl-pyrimidin-4-yl, 2-methylsulphonyl-5-chloro-6-chloromethyl-pyrimidin-4-yl, 2-methylsulphonyl-4-chloro-6-methyl-pyrimidine-5-sulphonyl, 2-methylsulphonyl-5-nitro-6-methyl-pyrimidin-4-yl, 2,5,6-tris-methylsulphonyl-pyrimidin-4-yl, 2-methylsulphonyl-5,6-dimethyl-pyrimidin-4-yl, 2-ethysulphonyl-5-chloro-6-methyl-pyrimidin-4-yl, 2-methylsulphonyl-6-chloro-pyrimidin-4-yl, 2,6-bis-methylsulphonyl-5-chloro-pyrimidin-4-yl, 2-methylsulphonyl-6-carboxy-pyrimidin-4-yl, 2-methylsulphonyl-5-sulpho-pyrimidin-4-yl, 2-methylsulphonyl-5-cyano-6-methoxy-pyrimidin-4-yl, 2-methylsulphonyl- 5-chloro-pyrimidin-4-yl, 2-sulphoethylsulphonyl-6-methyl-pyrimidin-4-yl, 2-methylsulphonyl-5-bromo-pyrimidin-4-yl, 2-phenylsulphonyl-5-chloro-pyrimidin-4-yl, 2-carboxy methylsulphonyl-5-chloro-6-methyl-pyrimidin-4-yl, 2-methylsulphonyl-6-chloropyrimidine-4- and -5-carbonyl, 2,6-bis-(methyl-sulphonyl)-pyrimidine-4- or -5-carbonyl, 2-ethylsulphon-yl-6-chloropyrimidine-5-carbonyl, 2,4-bis-(methylsulphon-yl)-pyrimidine-5-sulphonyl and 2-methylsulphonyl-4-chloro-6-methylpyrimidine-5-sulphonyl or -carbonyl; triazine rings containing ammonium groups, such as 2-tri-methylammonium-4-phenyl-amino- or -4-(o-, m- or p-sulpho-phenyl)-amino-triazin-6-yl, 2-(1,1-dimethylhy-drazinium)-4-phenyl-amino- or -4-(o-, m- or p-sulpho-phenyl)-amino-triazin-6-yl, 2-(2-isopropylidene-1,1-dimethyl)-hydrazinium-4-phenyl-amino- or -4-(o-, m- or p-sulphophenyl)-amino-trazin-6-yl and 2-N-aminopyr-rolidinium- or 2-N-aminopiperidinium-4-phenyl-amino- or -4-(o-, m- or p-sulphophenyl)-amino-triazin-6-yl, and furthermore, 4-phenylamino- or 4-(sulpho-phenylamino)-triazin-6-yl radicals which contain 1,4-bisazabicyclo-[2,2,2]-octane or 1,2-bisazabicyclo-[0,3,3]-octane bonded in quaternary form in the 2-position via a nitrogen bond, and 2-pyridinium-4-phenyl-amino- or -4-(o-, m- or p-sulphophenyl)-amino-triazin-6-yl and the corresponding 2-onium-triazin-6-yl radicals which are substituted in the 4-position by alkylamino, such as methylamino, ethylamino or β-hydroxyethylamino or alkoxy, such as phenoxy, or sulphophenoxy groups; 2-chlorobenzo-thiazole-5- or -6-carbonyl or -5- or -6-sulphonyl, 2-arylsulphonyl- or -alkylsulphonyl-benzo-thiazole-5- or -6-carbonyl or -5- or -6-sulphonyl, such as 2-methylsulphonyl- or 2-ethylsulphonyl-benzothiazole-5- or -6-sulphonyl or -carbonyl, 2-phenylsulphonylben-zothiazole-5- or -6-sulphonyl or -carbonyl and the corresponding 2-sulphonyl-benzothiazole-5- or -6-carbonyl or -sulphonyl derivatives containing sulpho groups in the fused-on benzene ring, 2-chlorobenzoxazole-5- or -6-carbonyl or -sulphonyl, 2-chlorobenzimidazole-5- or -6-carbonyl or -sulphonyl, 2-chloro-1-methylben-zimidazole-5- or -6-carbonyl or -sulphonyl, 2-chloro-4-methylthiazole-(1,3)-5-carbonyl or -4- or -5-sulphonyl, and the N-oxide of 4-chloro- or 4-nitro-quinoline-5-car-bonyl.

Also to be mentioned are reactive groups of the aliphatic series, such as acryloyl, mono, di- or tri-chloroacryloyl, such as —CO—CH=CH—Cl, —CO—CCl=CH$_2$ and —CO—CCl=CH—CH$_3$, and furthermore —CO—CCl=CH—COOH, and —CO—CCl=CH—CH$_3$, β-chloropropionyl, 3-phenyl-sulphonylpropionyl, 3-methylsulphonylpropionyl, β-sulphatoethylaminosulphonyl, vinylsulphonyl, β-chloroethylsulphonyl, β-sulphatoethylsulphonyl, β-phosphatoethylsulphonyl, β-thiosulphatoethylsulpho-nyl, β-methylsulphonylethylsulphonyl, β-phenylsul-phonylethylsulphonyl, 2-fluoro-2-chloro-3,3-difluorocyclobutane-1-carbonyl, 2,2,3,3-tetrafluorocy-clobutane-1-carbonyl or -1-sulphonyl, β-(2,2,3,3-tetra-fluoro-1-cyclobutyl)-acryloyl and α- or β-bromoacryl-oyl, or α- or β-alkyl- or -aryl-sulphonylacryloy groups, such as α- or β-methylsulphonylacryloyl and α,β-dichloro- or dibromo-propionyl.

However, preferred fibre-reactive radicals are those which contain at least one reactive substituent bonded to a 5- or 6-membered heterocyclic ring, in particular to a so-called triazine ring or pyrimidine ring.

Preferred dyestuffs of the formula (I) are those of the formula

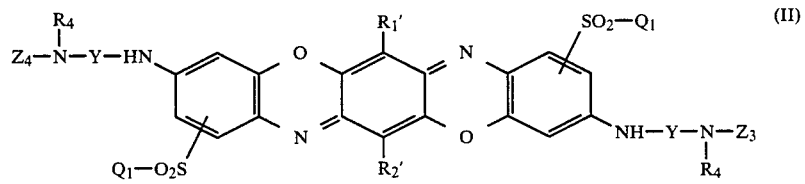

wherein $Z_3$, $Z_4$ = heterocyclic fibre-reactive radical or H,
$R'_1$, $R'_2$ = Cl, Br, CH$_3$, H,
$Q_1$ = sulpho-C$_1$-C$_6$-alkyl, 3- to 6-sulphato-C$_3$-C$_6$-alkyl, sulphophenyl-C$_1$-C$_4$-alkyl, carbonyl-C$_1$-C$_6$-alkyl and
Y, $R_4$ have the abovementioned meaning,
and also those of the formula

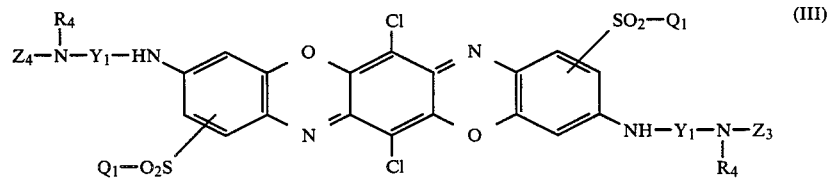

wherein
$Y_1$ = C$_2$-C$_6$-alkylene, cyclohexylene and
$Z_3$, $Z_4$, $R_4$ and $Q_1$ have the abovementioned meaning.
Particular preference is given to dyestuffs of the formula

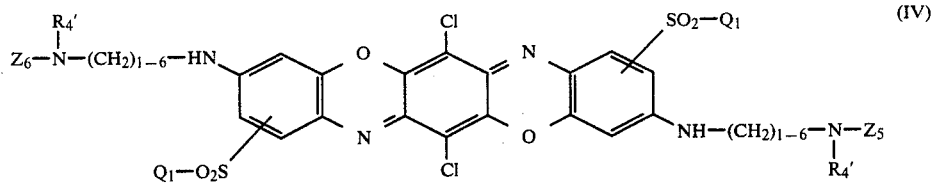 (IV)

wherein
$R'_4 = H$, $CH_2—CH_2—OSO_3H$,
$Z_5$, $Z_6$ = halogenotriazinyl or halogenopyrimidinyl radical and
$Q_1$ has the abovementioned meaning.

The preparation of compounds of the formula I where $Z_1$ and/or $Z_2$ = fibre-reactive radical is effected in a manner known per se by reaction of compounds of the formula

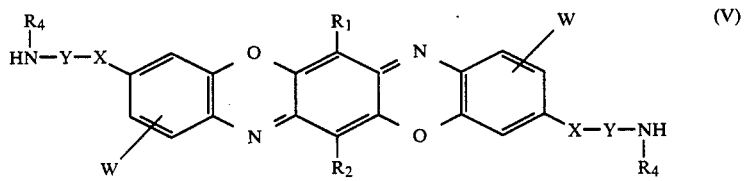 (V)

wherein $R_4$, X, Y have the abovementioned meaning, with reactive components

Z—halogen (VI)

wherein
Z = fibre-reactive radical
halogen = F, Cl, Br.

The condensation of the dioxazine compounds of the formula (V) and the reactive components (VI) is carried out either in an aqueous or aqueous-organic medium, depending on the reactive component employed, at temperatures of 0°–80° C. and pH 3–9 in the presence of alkaline condensing agents such as aqueous alkali metal hydrogencarbonate, alkali metal carbonate, alkali metal hydroxide, alkali metal hydrogenphosphate, dialkali metal phosphate or trialkali metal phosphate solution, or in aprotic organic solvents such as toluene, halogenobenzene, nitrobenzene, dimethylformamide, N-methylpyrrolidone, tetramethylene sulphone, dimethyl sulphoxide, acetone, methyl ethyl ketone in the presence or absence of aprotic organic bases such as trialkylamine, N,N-dialkylaniline, pyridine or alkylpyridines at temperatures of 0°–80° C.

The preparation of compounds of the formula (V) is effected by methods known per se by condensing 1,4-benzoquinones of the formula

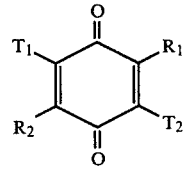 (VII)

wherein
$R_1$ and $R_2$ have the abovementioned meaning and
$T_1$ and $T_2$ denote hydrogen, Cl, Br, Oalkyl or Oaryl, with the likewise claimed aminosulphone compounds of the formula

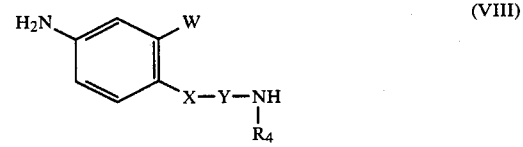 (VIII)

wherein $R_4$, X, Y and Q have the abovementioned meaning, to give anil compounds of the formula

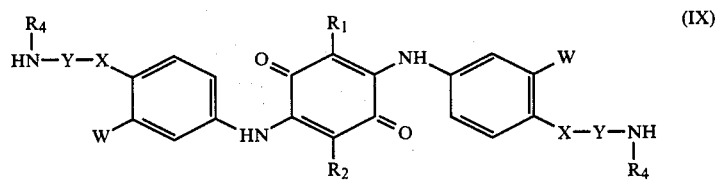 (IX)

wherein $R_1$, $R_3$, $R_4$, X, Y have the abovementioned meaning and ring closure of the anil compounds (IX) to give the dioxazine dyestuff bases (V).

Depending on the reaction conditions used for the ring closure, the sulphonyl group W with the dioxazines (V) can appear in the benzo rings of the dioxazine system either in the o- or in the p-positions relative to the ring oxygen atoms of the dioxazine system.

Aminosulphone compounds of the formula (VIII) are prepared from nitrosulphones of the formula

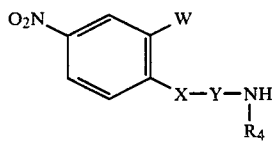 (X)

wherein R$_4$, X, Y have the abovementioned meaning, by reduction with catalytic hydrogen or with metals and acid such as, for example, with iron or zinc in the presence of acetic acid or hydrochloric acid or with other reagents suitable for the reduction of aromatic nitro compounds.

Compounds of the formula (X) can be prepared for example by condensation of 2-chloro-5-nitrobenzene-sulphones of the formula

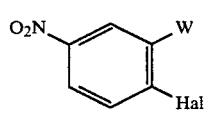 (XI)

wherein halogen=F, Cl, Br and W has the abovementioned meaning, with amino compounds of the formula

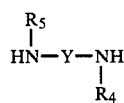 (XII)

wherein R$_4$, R$_5$, Y have the abovementioned meaning, or with compounds of the formula

HX—Y—G  (XIII)

wherein G=NO$_2$, acylamino such as formylamino, acetylamino, oxalylamino, benzoylamino, tosylamino and X, Y have the abovementioned meaning, and subsequent conversion of the group G into

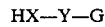

by reduction or hydrolysis.

Compounds of the formula (XI) can be obtained by reaction of 2-halogeno-5-nitrobenzenesulphinic acids with halogen compounds Hal—Q  (XIV)

wherein halogen=F, Cl, Br, I and Q has the abovementioned meaning, or by addition of 2-halogeno-5-nitro-benzenesulphinic acids onto alkylated ethylene oxides of the formula

 (XIva)

wherein
R$_8$=H or C$_1$-C$_4$-alkyl,
R$_9$=H or C$_1$-C$_4$-alkyl,
R$_{10}$=C$_1$-C$_4$-alkyl, aryl or by addition of 2-halogeno-5-nitrobenzenesulphinic acids onto compounds which contain activated double bonds and have the formula

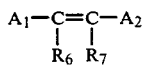 (XV)

wherein
A$_1$=H or activating substituent such as COOH, CN, COOC$_1$-C$_4$-alkyl,
A$_2$=activating substituent such as COOH, CN, CH=O, COOC$_1$-C$_4$-alkyl, CONH$_2$, SO$_3$H, C$_6$H$_5$,
R$_6$, R$_7$=H, C$_1$-C$_4$-alkyl or wherein A$_1$, A$_2$ can also be attached to the activated double bond to give

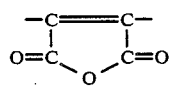

and if desired subsequent conversion of the primary sulphone product of the formula

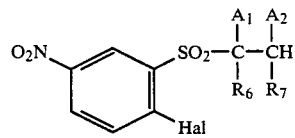 (XVI)

wherein halogen, A$_1$, A$_2$, R$_6$ and R$_7$ have the abovementioned meaning, into the compounds of the formula (XI).

It is also possible to functionalise phenyl or hydroxyl groups in the radicals Q and/or Y and/or R$_4$, R$_5$ in compounds of the formula (IX) in the subsequent ring closure reaction to give compounds of the formula (V) in sulphuric acid or oleum subsequently with SO$_3$H or OSO$_3$H substituents.

The condensation of the benzoquinones of the formula (VII) with the aminosulphone compounds of the formula (VIII) is best carried out in an aqueous or aqueous-organic medium in the presence of alkaline condensing agents at pH 3-11, preferably pH 4-8, and at temperatures of 20°-90° C., preferably 40°-70° C., or in buffered solutions which contain above alkaline condensing agents. It is also possible to carry out the reaction in a purely organic medium in the presence of acid-binding agents.

Alkaline condensing agents are for example sodium hydrogencarbonate, sodium carbonate, sodium acetate, potassium acetate, sodium hydroxide, potassium hydroxide, sodium phosphates, sodium borate.

In general the condensation products of the formula (IX) are obtained as sparingly soluble brown products.

A variant for preparing compounds of the formula (IX) consists in the addition of aminosulphone compounds of the formula (VIII) onto 1,4-benzoquinones of the formula

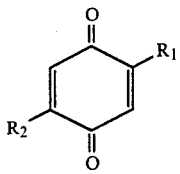

(XVII)

wherein $R_1$ and $R_2$ have the abovementioned meaning, and the oxidation of the adduct intermediates.

The cyclisation of the quinone condensation products (IX) can be carried out by methods which are known per se, such as those mentioned in German Offenlegungsschriften 2,122,262, 2,124,080, 2,302,382, 2,344,781, 2,503,611 and 2,823,828, and in British Patent Specification 2,019,872, in particular in concentrated sulphuric acid and, in particular, in oleum with $SO_3$ contents of 1–50%, at temperatures of 10°–80° C., if appropriate with the addition of oxidising agents, such as potassium peroxodisulphate or ammonium peroxodisulphate or organic peroxides.

The new dyestuffs are useful products which are distinguished by high tinctorial strengths. They are suitable for a very wide range of uses in dispersed or dissolved form.

In the form of water-soluble compounds, they are preferably of interest for dyeing textile materials containing hydroxyl of amide groups, in particular materials of natural or regenerated cellulose and nylon and polyurethane fibres, wool and silk.

If the dyestuffs are water-soluble reactive dyestuffs, the materials mentioned are dyed or printed by the generally known processes which are customary for reactive dyestuffs. Blue dyeings and prints which have good light and wet fastness are then obtained.

The temperatures in the examples are in °C. The formulae of the water-soluble dyestuffs in the description and in the examples are those of the free acids. If the dyestuffs are reactive dyestuffs, these are as a rule isolated and used in the form of their alkali metal salts, in particular the lithium, sodium or potassium salts.

EXAMPLE 1

3-(2-chloro-5-nitrophenylsulphonyl)-propionic acid 36 g of sodium 2-chloro-5-nitrobenzenesulphinate, 12.6 g of solid sodium hydrogen carbonate and 22.5 g of maleic anhydride are heated at 100° C. in 250 ml of water for 3 hours. After cooling down, a further 12.6 g of sodium hydrogencarbonate and 22.5 g of maleic anhydride are then added. After a further 5 hours of stirring at 100° C., the cooled, weakly acid reaction mixture is filtered with suction. The filter is cake at 50° C. in 300 ml of water, and the suspension is cooled down to 20° C. and is filtered again with suction. Drying gives 35.1 g of 3-(2-chloro-5-nitrophenylsulphonyl)-propionic acid.

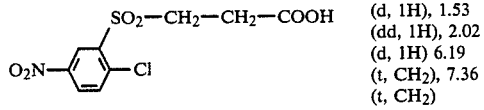

| $^1$H—NMR (d$_6$-DMSO): | $\tau = -2$ to $-1.5$ (broad COOH), 1.41 (d, 1H), 1.53 (dd, 1H), 2.02 (d, 1H) 6.19 (t, CH$_2$), 7.36 (t, CH$_2$) |
|---|---|

EXAMPLE 2

3-[2-(2(2-N-β-hydroxyethyl)aminoethyl)amino-5-nitrophenylsulphonyl]-propionic acid 29.5 g of 3-(2-chloro-5-nitrophenylsulphonyl)propionic acid and 30 g of 2-(2-aminoethylamino)ethanol are refluxed in 200 ml of isopropanol for three hours. The reaction mixture is cooled down and filtered with suction, and the precipitate is washed twice with 100 ml of water and is dried. This give 30.5 g of pale yellow 3-[2-(2-β-hydroxyethyl)aminoethyl)-amino-5-nitrophenylsulphonyl]-propionic acid.

EXAMPLE 3

3-[2-(2-(N-β-hydroxyethyl)-aminoethyl)-amino-5-aminophenylsulphonyl]-propionic acid 28.9 g of 3-[2-(2-(N-β-hydroxyethyl)-aminoethyl)-amino-5-nitrophenylsulphonyl]-propionic acid are suspended in 200 ml of ethanol and 200 ml of water. In an autoclave 1 g of Raney nickel is added, 7–10 bar of hydrogen are injected, and the temperature is raised to 60°–65° C. until there is no further consumption on injection of further hydrogen. After the reduction has ended, the resultant solution is clarified hot from Raney nickel, the nickel residue is washed with 30 ml of hot water, and the resultant solution is reacted as per Example 4.

EXAMPLE 4

A solution, obtained as per Example 3, of 24.8 g of 3-[2-(2-(N-β-hydroxyethyl)-aminoethyl)-amino-5-aminoophenylsulphonyl]-propionic acid in 200 ml of ethanol and 230 ml of water is brought to pH 5.5 with concentrated hydrochloric acid. After addition of 9.2 g of 2,3,5,6-tetrachloroquinone the reaction mixture is warmed to 40° C. and the pH is maintained with 2N sodium carbonate solution. After 2 hours the temperature is raised to 50° C. and after a further 2 hours to 60° C. The reaction product crystallises out in fine brown needles. When the condensation has ended and there is no further consumption of sodium carbonate, the reaction product is filtered off with suction while still hot, is washed with 100 ml of 50% strength ethanol and then with water and finally with acetone and is dried at 60° C. The product corresponds to the formula

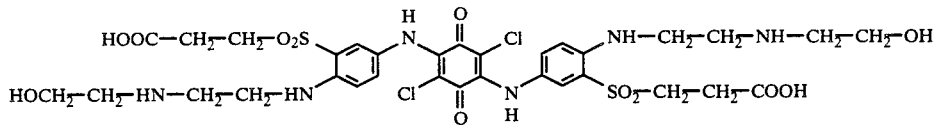

EXAMPLE 5

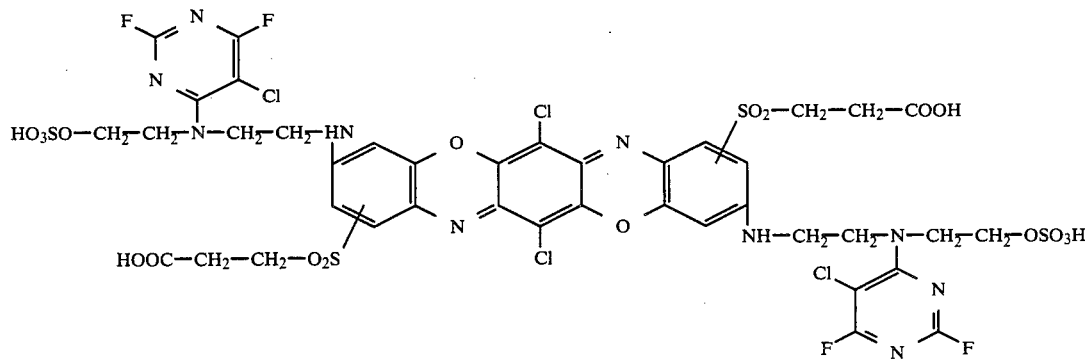

15 g of the condensation product obtained in Example 4 are gradually added at 0°–5° C. to 80 g of 90% strength sulphuric acid, and the mixture is stirred for 1 hour until solution is complete. The olive-green solution then has gradually added to it 3.4 g of pyrolusite having an active content of 88% $MnO_2$. The reaction mixture is stirred at 0°–5° C. for one hour and at 20°–25° C. for a further hour. The colour of the reaction mixture has changed from olive-green to violet. The violet solution is added to 800 g of ice-water, the precipitated reaction product is filtered off with suction, the filter cake is washed with water until it gives a weakly acid (pH 3–3.5) and sulphate-free reaction and is then dried at 60° C. in a circulation air cabinet.

This gives 15.76 g of a substance of the formula sodium chloride. The precipitate is filtered off with suction, is washed with 5% strength sodium chloride solution and is dried at 50° C. in a circulating air cabinet. The resultant dyestuff conforms to the formula It dyes cotton from a long liquor in deep bright blue shades. C.I. indicator number 13.

$\lambda_{max} = 614$ nm in water.

EXAMPLE 7

A solution of 5.7 g of 2-aminobenzenesulphonic acid in 110 ml of water has added to it at 0°–5° C. and dropwise 4.9 g of cyanuric fluoride in the course of 5 minutes, and the pH is maintained at 3.5–4.0 with 2N sodium carbonate solution. After the condensation has ended, the suspension of the reactive component is carefully brought to pH 6, and a solution, adjusted to pH 7, of 10.0 g of the triphendioxazine component of Example 5 in 200 ml of water is then added. During the addition, the reaction mixture is maintained with so-

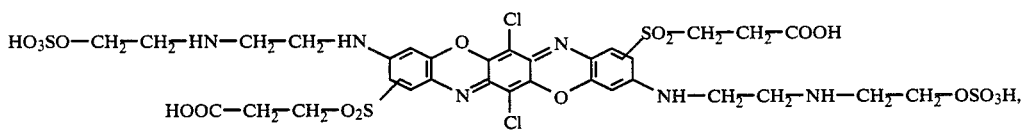

which, at pH 7, gives a clear blue solution in water.

EXAMPLE 6

10.0 g of triphendioxazine compound of Example 5 are dissolved in 200 ml of water by adjusting the pH to 7, and the solution is cooled down to 0°–5° C. 4.5 g of 2,4,6-trifluoro-5-chloropyrimidine are added dropwise, and the pH of the reaction mixture is maintained at 8.5–9.0 with sodium carbonate solution. After the condensation has ended, the reaction mixture is brought to 6.0, and the dyestuff is salted out at 20° C. with 20 g of dium carbonate solution at pH 9 and the temperature is maintained at 5°–10° C. If after some hours the consumption of sodium carbonate has ceased and the starting triphendioxazine is no longer detectable by chromatography, the resultant solution is brought to pH 6 and warmed to 20° C. The reactive dyestuff is salted out with 50 g of sodium chloride, and the precipitate is filtered off with suction and washed with 10% strength sodium chloride solution. After pasting with pH 6 phosphate buffer the dyestuff is dried at 50° C. in a circulating air cabinet. It conforms to the formula

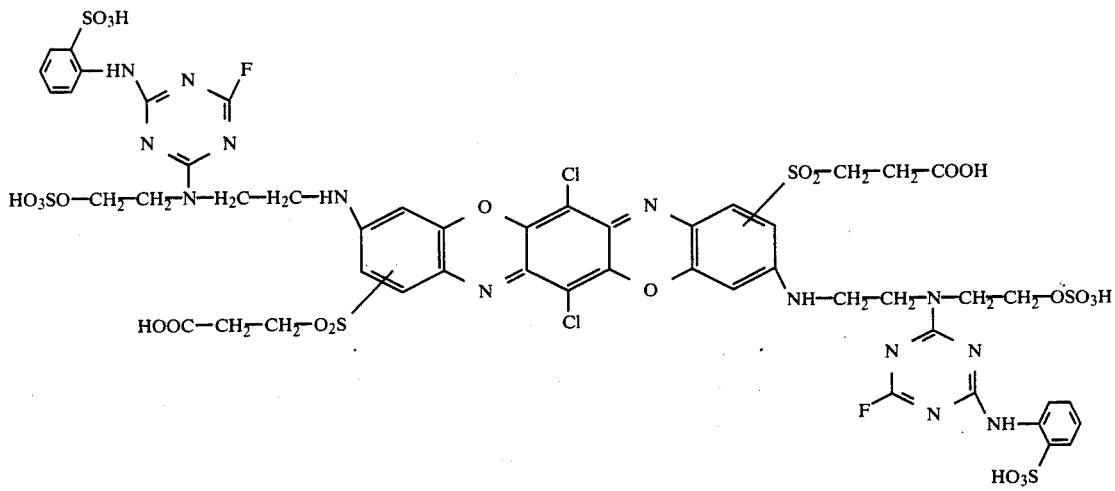

and dyes cotton from a long liquor in bright blue shades. C.I. indicator number 13. $\lambda_{max}=627$ nm in water.

EXAMPLE 8

3-[2-(2-aminoethyl)amino-5-nitrophenylsulphonyl]-propionic acid 29.5 g of 3-(2-chloro-5-nitro-5-nitrophenylsulphonyl)propionic acid and 15 g of 1,2-diaminoethane are refluxed in 150 ml of isopropanol for two hours. The reaction mixture is cooled down to 0° C. and filtered with suction. The isolation is suspended in 100 ml of water, the suspension is brought to pH 3.5, and 15 g of sodium chloride are added for salting out. The precipitated betaine is filtered off with suction and dried. The yield of 3-[2-(-aminoethyl)amino-5-nitrophenylsulphonyl]-propionic acid is 28.5 g.

$^1$H—NMR (d$_6$-DMSO/CF$_3$CO$_2$H):

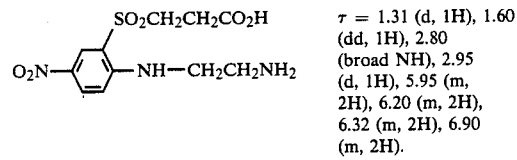

$\tau = 1.31$ (d, 1H), 1.60 (dd, 1H), 2.80 (broad NH), 2.95 (d, 1H), 5.95 (m, 2H), 6.20 (m, 2H), 6.32 (m, 2H), 6.90 (m, 2H).

EXAMPLE 9

3-[5-amino-2-(2-aminoethyl)-aminophenylsulphonyl]-propionic acid 27.0 g of 3-[2-(2-aminoethyl)-amino-5-nitrophenylsulphonyl]-propionic acid are suspended in 150 ml of water and 150 ml of ethanol. In an autoclave 1 g of nickel is added to the suspension, 60–70 bar of hydrogen are injected, and the temperature is raised to 60° C. Stirring is continued for some time until no further hydrogen is absorbed. After letting down, the resultant solution is clarified at 70° C. with 1 g of activated charcoal, the clarification residue is washed with 20 ml of hot water, and the combined filtrates are reacted as per Example 10.

$^1$H—NMR (DCl)

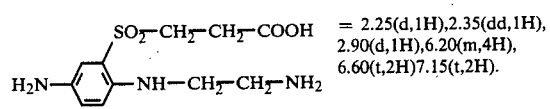

= 2.25(d,1H),2.35(dd,1H), 2.90(d,1H),6.20(m,4H), 6.60(t,2H)7.15(t,2H).

EXAMPLE 10

The solution, obtained in Example 9, of 23.2 g of 3-[5-amino-2-(2-aminoethyl)-aminophenylsulphonyl]-propionic acid in 150 ml of ethanol and 170 ml of water is adjusted with concentrated hydrochloric acid from pH 7 to 5.5. 9.9 g of 2,3,5,6-tetrachloroquinone are added, the temperature is raised to 40° C. and the pH is maintained at 5.5 with sodium carbonate solution. After 2 hours the temperature is raised to 50° C. and after a further 2 hours to 60° C. When the absorption of sodium carbonate has ceased, the reaction product, which has crystallised out in brown needles, is filtered off with suction while still hot, and is washed with 100 ml of 50% strength ethanol, then with water and finally with acetone. Drying at 60° C. gives a substance which gives olive-green solutions in concentrated sulphuric acid and has the formula

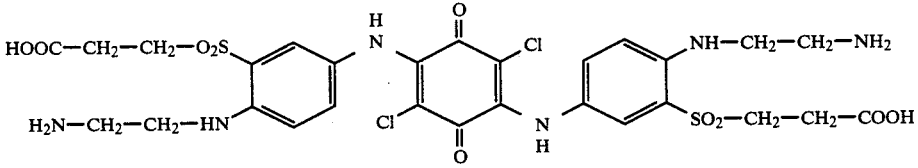

EXAMPLE 11

15 g of the condensation product obtained in Example 10 are gradually added at 0°–5° C. to 70 g of 90% strength sulphuric acid. The mixture is stirred for an hour until solution is complete. The above olive-green soluton has gradually added to it 4.0 g of pyrolusite having an active content of 88% MnO₂, while the temperature is further maintained at 0°–5° C. The colour of the reaction mixture gradually changes from olive-green to bluish violet. Stirring is continued at 0°–5° C. for a further hour and then at 20°–25° C. for an hour, and the solution is then added to 700 g of ice-water. The precipitated product is filtered off with suction, is washed with water until free of sulphuric acid and is dried at 60° C. in a circulating air cabinet. This gives a substance of the formula

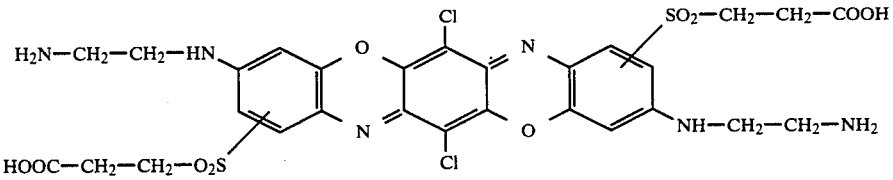

which gives a bright blue solution in water on addition of sodium hydroxide solution.

EXAMPLE 12

9.5 g of 2-aminobenzene-1,4-disulphonic acid are dissolved in 90 ml of water by addition of sodium carbonate solution up to pH 4. To the solution is added dropwise at 0°–5° C. at a uniform rate 5.1 g of cyanuric fluoride in the cource of 10 minutes, the pH is maintained at 4.0–4.5 by addition of further sodium carbonate solution, the mixture is subsequently stirred for a further 30 minutes and is then brought to pH 5.5.

8.9 g of triphendioxazine compound of Example 11 are dissolved in 180 ml of water, 18 ml of caprolactam and 6.5 g of 15% strengh sodium hydroxide solution.

This solution and the solution of the reactive component prepared above are added dropwise at 0°–5° C. in equal amounts to 50 ml of ice-water in such a way that the pH in the reaction mixture is maintained at 9.0. If necessary, this is achieved by metered addition of 2N sodium hydroxide solution. After the two solutions have been combined, the pH is further maintained at 9.0, and the batch is stirred at 0°–5° C. for some further hours until the condensation has ended. The temperature is raised to 20° C., and the dyestuff is salted out of the solution with sodium chloride, is filtered off with suction and is washed with sodium chloride solution. The filter cake is mixed with a little phosphate buffer (pH =6) and is dried at 50° C. in vacuo. This gives a dyestuff in the formula

EXAMPLE 13 benzyl 2-chloro-5-nitrophenyl sulphone 24.4 g of the sodium salt of 2-chloro-5-nitrobenzene-sulphinic acid are dissolved in 150 ml of ethanol under reflux conditions, and 35 g of benzyl chloride are gradually added. After 10 to 12 hours under reflux conditions the solution is cooled down to 60° C., and the precipitated salt is separated off by filtration. The solution, on cooling down to 0° C., yields 24.1 g of colourless crystals of benzyl 2-chloro-5-nitrophenyl sulphone.

¹H—NMR (d₆-DMSO):

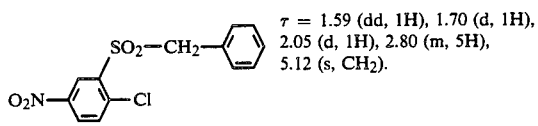

τ = 1.59 (dd, 1H), 1.70 (d, 1H), 2.05 (d, 1H), 2.80 (m, 5H), 5.12 (s, CH₂).

EXAMPLE 14

[2-(2-aminoethyl)amino-5-nitrophenyl]-benzyl sulphone 16.0 g of benzyl 2-chloro-5-nitrophenyl sulphone and 12.0 g of 1,2-diaminoethane are refluxed in 100 ml of isopropanol for one hour. The reaction mixture is cooled down, and the solids are filtered off with suction, are washed with 50 ml of water and are dried. This gives 19.2 g of pale yellow [2-(2-aminoethyl)-amino-5-nitrophenyl]-benzyl sulphone.

¹H—NMR (d₆-DMSO):

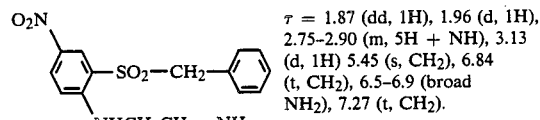

τ = 1.87 (dd, 1H), 1.96 (d, 1H), 2.75–2.90 (m, 5H + NH), 3.13 (d, 1H) 5.45 (s, CH₂), 6.84 (t, CH₂), 6.5–6.9 (broad NH₂), 7.27 (t, CH₂).

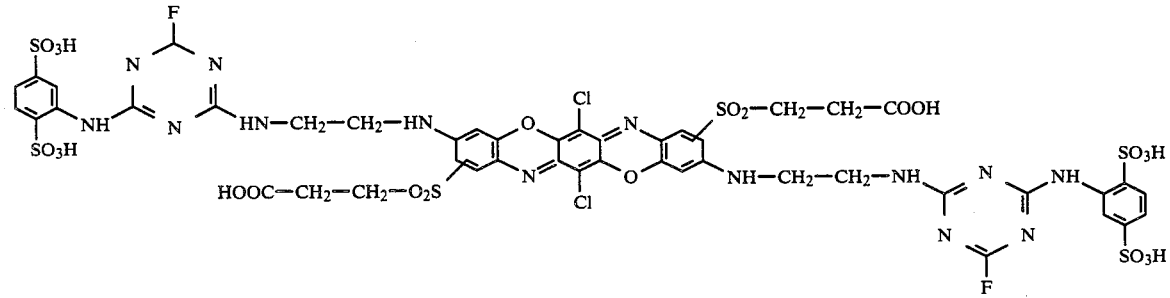

which dyes cellulose fibres from a long liquor in bright blue shades. C.I. indicator number 13. λ_max=614 nm in water.

EXAMPLE 15

5-amino-2-(2-aminoethyl)-aminophenyl benzyl sulphone 20.0 g of 2-(2-aminoethyl)-amino-5-nitrophenyl benzyl sulphone are suspended in 100 ml of ethanol and 100 ml of water. In an autoclave 1 g of Raney nickel is added, 40 bar of hydrogen are injected, and the temperature is raised to 60° C. until after a further injection of hydrogen there is no further consumption. After the reduction has ended the resultant solution is clarified hot from Raney nickel, the nickel residue is washed with 40 ml of hot water, and the resulting solution is reacted as per Example 16.

EXAMPLE 16

The solution obtained in Example 15, of 17.4 g of 5-amino-2-(aminoethyl)-aminophenyl benzyl sulphone in 100 ml of ethanol and 140 ml of water is brought to pH 6 with hydrochloric acid. 7.0 g of 2,3,5,6-tetrachloroquinone are added, the temperature is raised to 45° C. and the pH is constantly maintained at 5.5–6.0 with 2N sodium carbonate solution. After 2 hours the temperature is raised to 55° C. and after a further hour to 65° C. After the reaction has ended, the crystalline product is filtered off with suction at 20° C., is washed with a mixture of ethanol and water and then with water and is dried at 60° C. in a circulating air cabinet. The brown product conforms to the formula

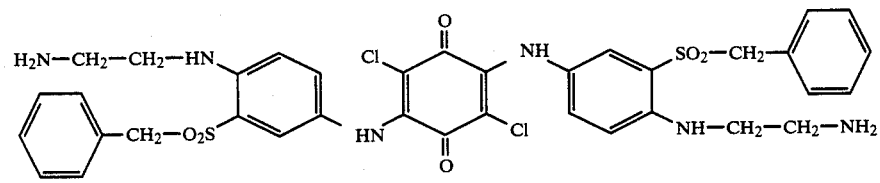

EXAMPLE 17

15.2 g of the condensation product obtained in Example 16 are gradually added at 0°–5° C. to 45 ml of 20% strength oleum. The temperature is allowed to rise to 20° C., and at 20° C. 10.5 g of potassium peroxodisulphate are added in the course of 1 hour. After the addition, stirring is continued for one hour, and the blue solution is then added to 450 g of ice-water. The precipitated product is filtered off with suction and washed with water. The filter cake is suspended in 200 ml of water, the suspension is brought to pH 8 with sodium hydroxide solution, 15 g of sodium chloride are added for salting out, and the precipitate is filtered off with suction and washed with 5% strength sodium chloride solution. The product dried at 60° C. conforms to the formula

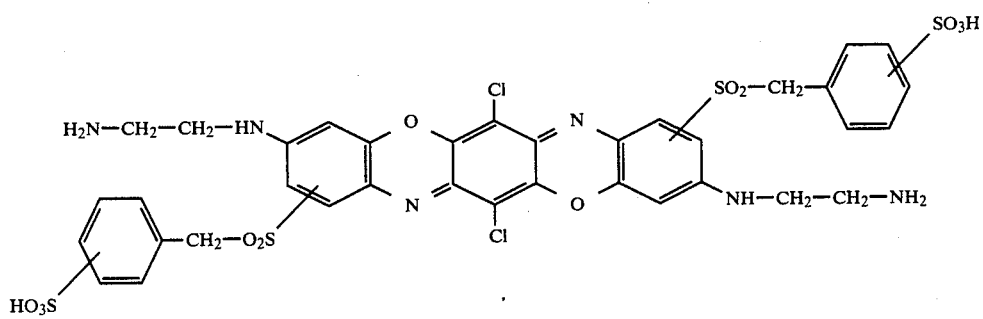

EXAMPLE 18

6.1 g of 2-aminobenzene-1,4-disulphonic acid are dissolved at pH 6 in 50 ml of water. To this solution are added 4.7 g of cyanuric chloride and 10 ml of acetone and at 20° C. the pH is maintained at 5.5 with sodium carbonate solution until a clear solution is formed and the condensation has ended.

To the reactive component is added a solution at pH 9 of 11.0 g of triphendioxaxine component from Example 17 in 100 ml of water, and the pH is maintained at 9 with dilute sodium hydroxide solution. When the reaction has ended after several hours, the pH of the solution is adjusted to 7, the resultant dyestuff is salted out with 80 g of sodium chloride, is filtered off with sucton, is washed with 25% strength sodium chloride solution and is dried at 60° C. in a circulating air cabinet.

The dyestuff conforms to the formula

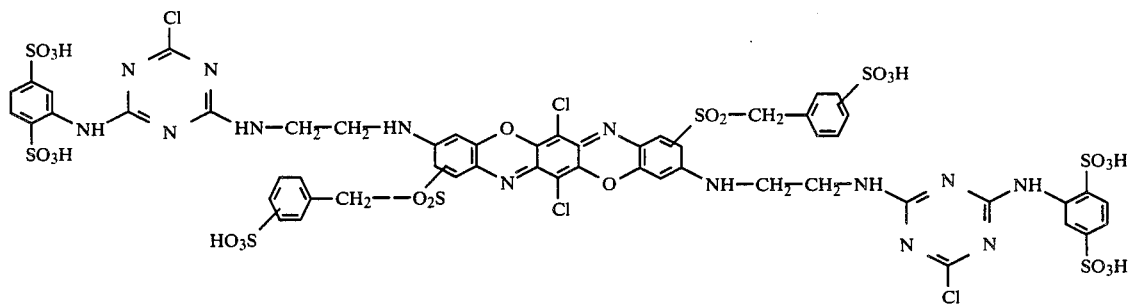

It can be used to dye and print cellulose fibres in deep bright blue shades. C.I. indicator number 13. $\lambda_{max}=614$ nm in water.

EXAMPLE 19

If a solution of 11.0 g of triphendioxazine component from Example 17 in 110 ml of water (pH 9) is reacted with a solution of a reactive component which has been prepared at 0°–5° C. and pH 4.0 from 8.1 g of 2-aminobenzene-1,4-disulphonic acid and 4.8 g of cyanuric fluoride in 80 ml of water analogously to Example 12 at pH 9.0, this after salting out, isolation and drying gives a dyestuff of the formula

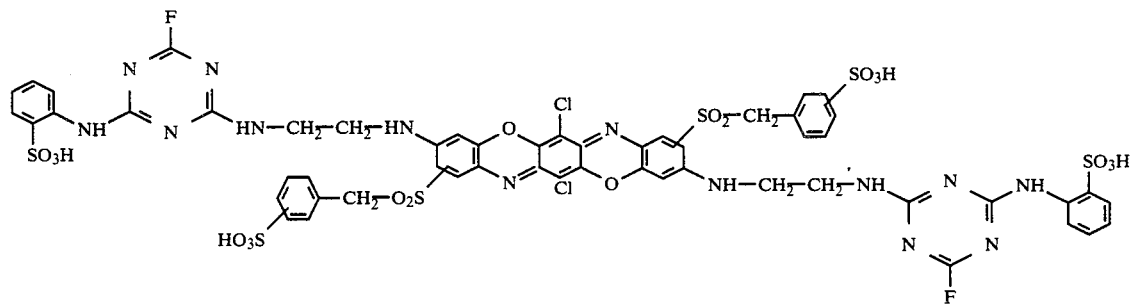

which dyes cotton in bright blue shades. C.I. indicator number 13. $\lambda_{max}=614$ nm in water.

EXAMPLE 20

If a solution of 10.0 g of triphendioxazine component of Example 17 in 200 ml of water (pH 9) is reacted with the suspension of the reactive component prepared from 5.1 g of 2-aminobenzenesulphonic acid and 4.2 g of cyanuric fluoride analogously to Example 12 by gradually adding dyestuff solution and reactive component simultaneously to 50 ml of water and maintaining in the reaction mixture the pH at 9.0 and the temperature at 0°–5° C., then this gives after isolation and drying a dyestuff of the formula

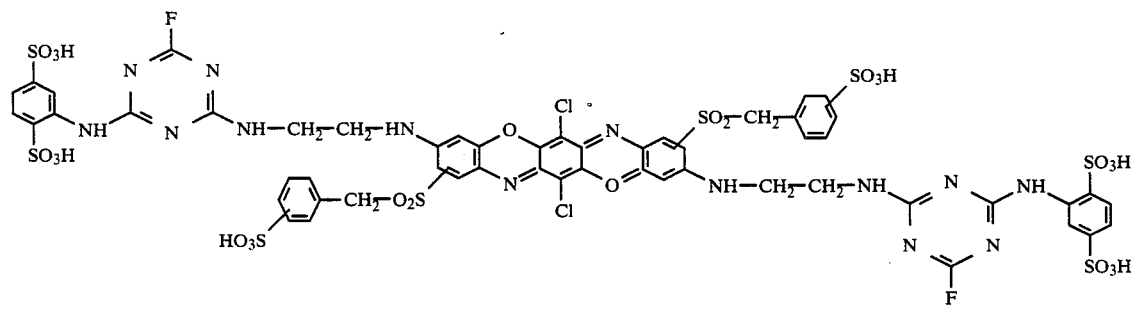

which likewise dyes cellulose fibres in bright blue shades. C.I. indicator number 13. $\lambda_{max}=624$ nm in water.

Further reactive dyestuffs which dye cellulose fibres in bright blue shades (C.I. indicator number 13) are obtained when, analogously to the preceding examples, the aminosulphones listed in column 1 of the table below are condensed with the quinones of column 2 in a molar ratio of 2:1, the resultant condensation products are converted in 90–100% strength sulphuric acid or oleum in the presence of oxidising agents such as $MnO_2$ or peroxodisulphates into the triphendioxazines of column 3, and these are condensed with the reactive components of the last column.

| Triphendioxazine |
|---|
| 1 |

1 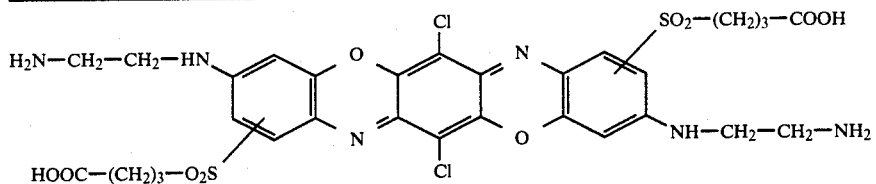
2 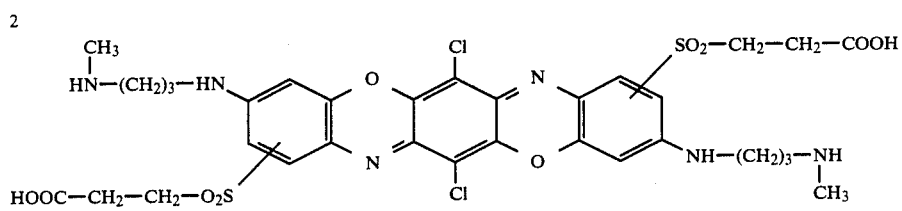
3 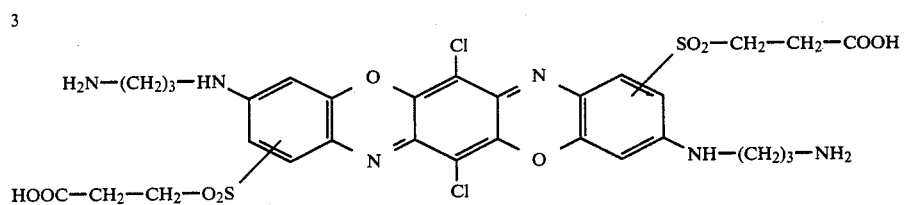
4         ''
5 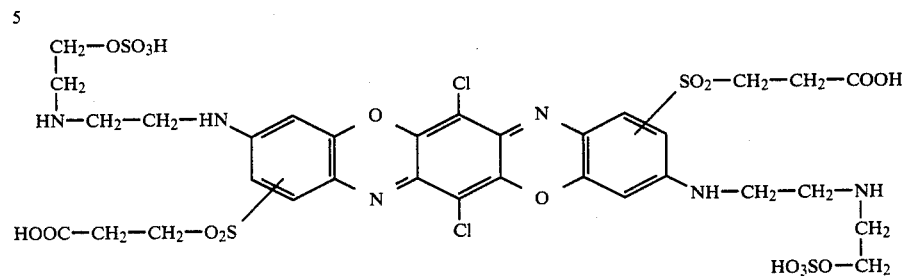
6 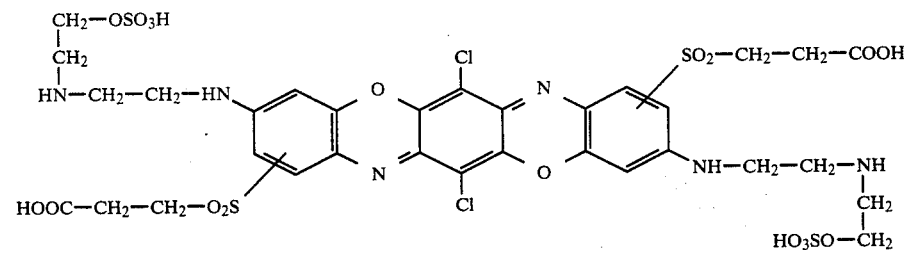
7         ''
8         ''
9 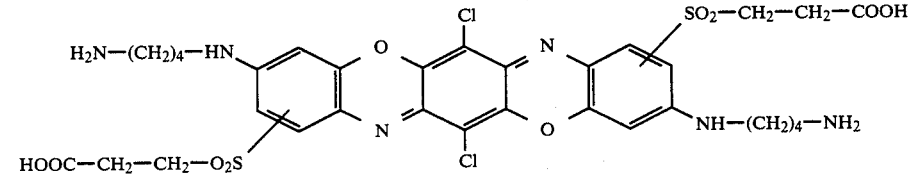
10

-continued
11
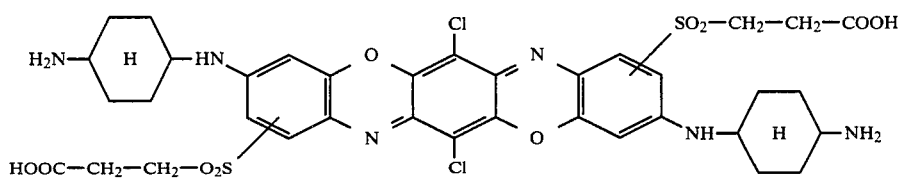
12
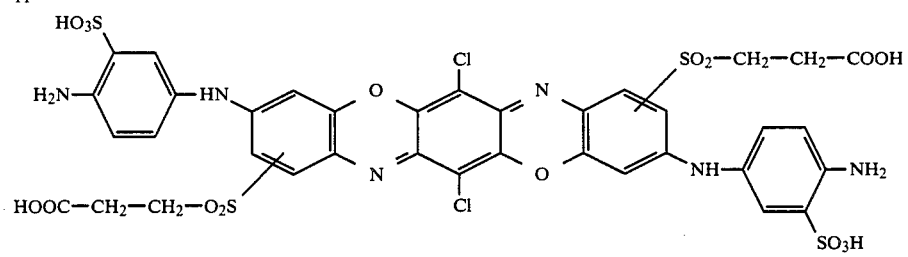
13
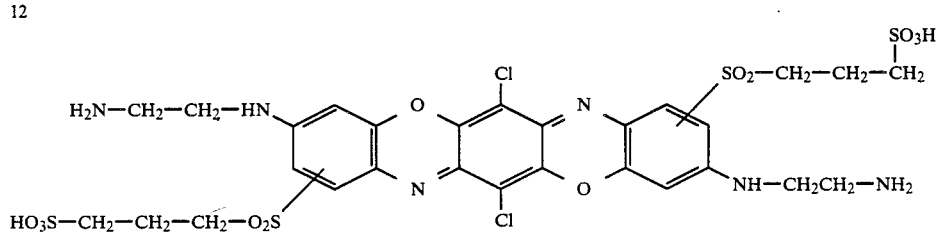
14
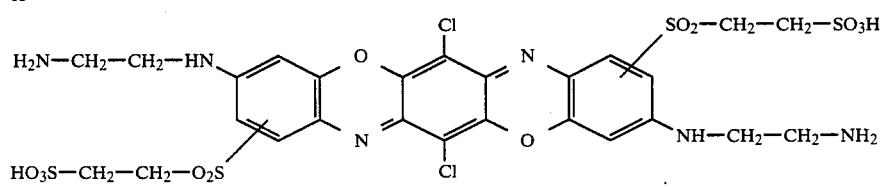
15
″
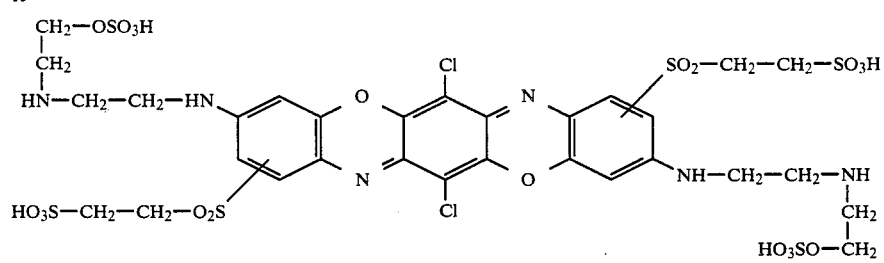
16
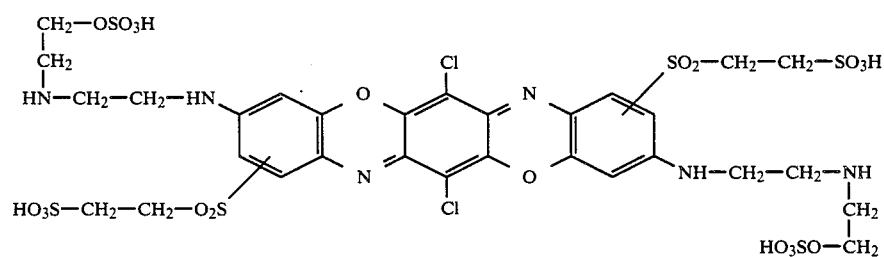
17

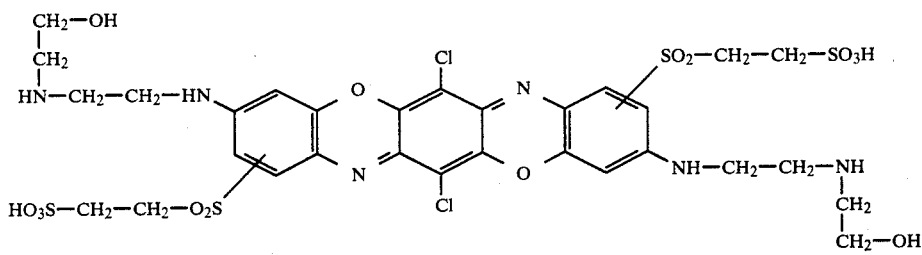
18
19 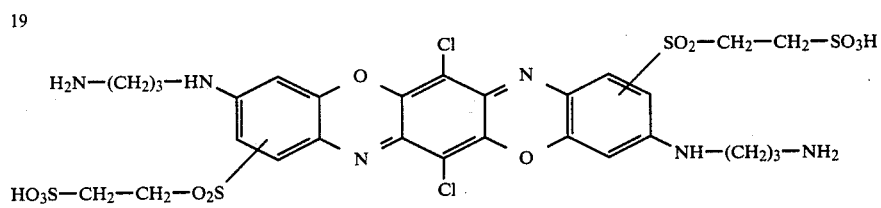
20 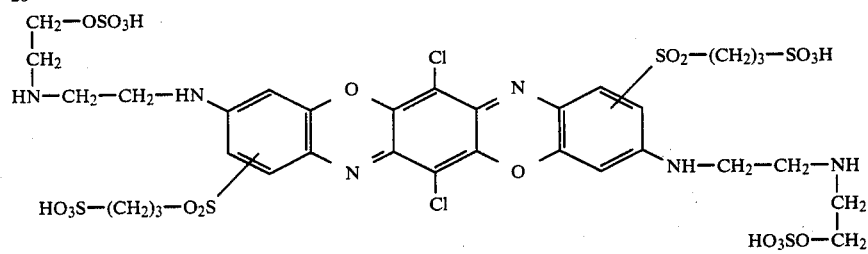
21  "
22  "
23 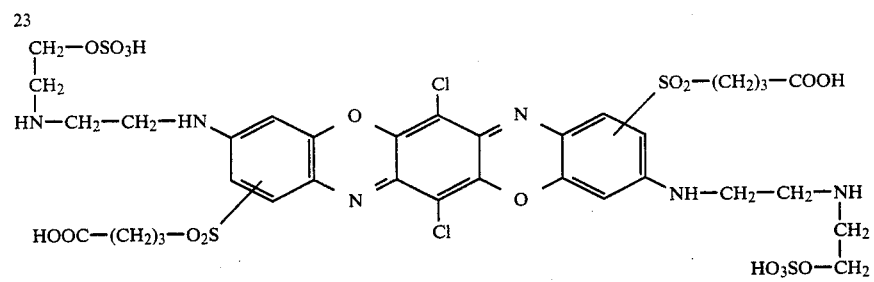
24  "
25 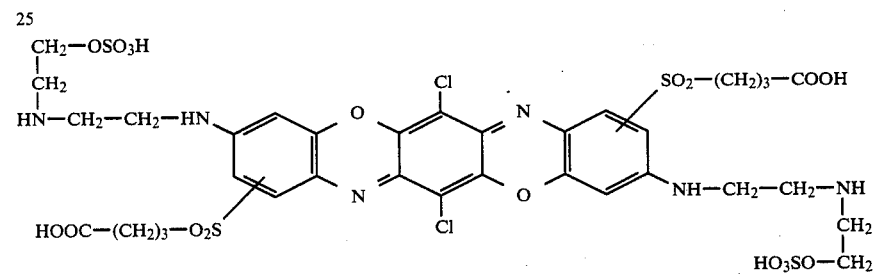
26  "
27

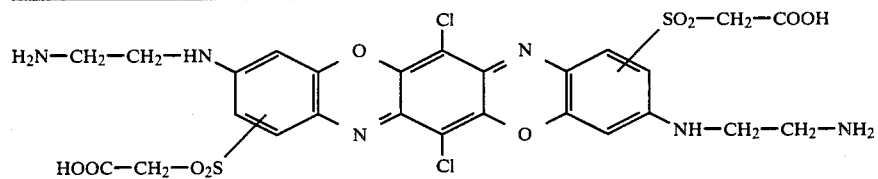
28
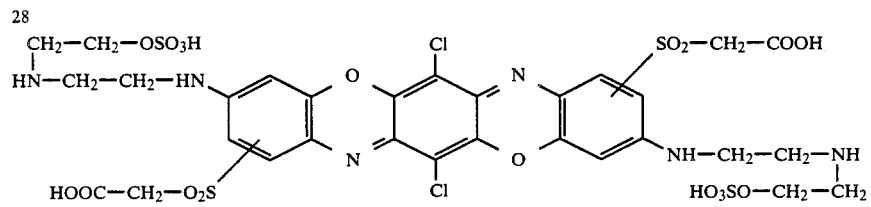
29 ″
30
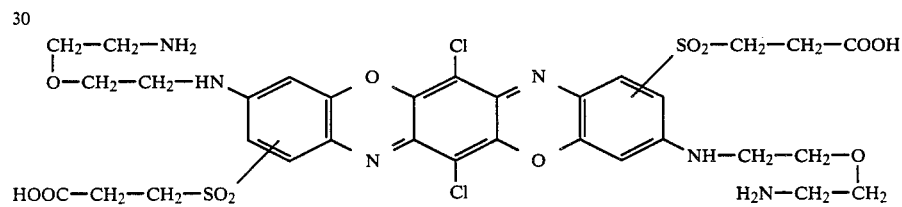
31
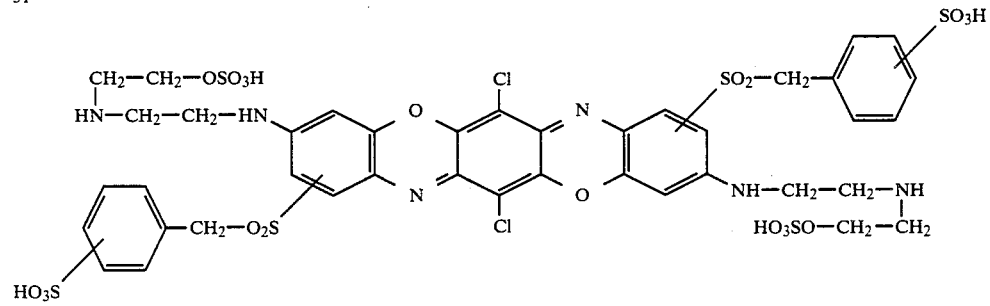
32 ″
33
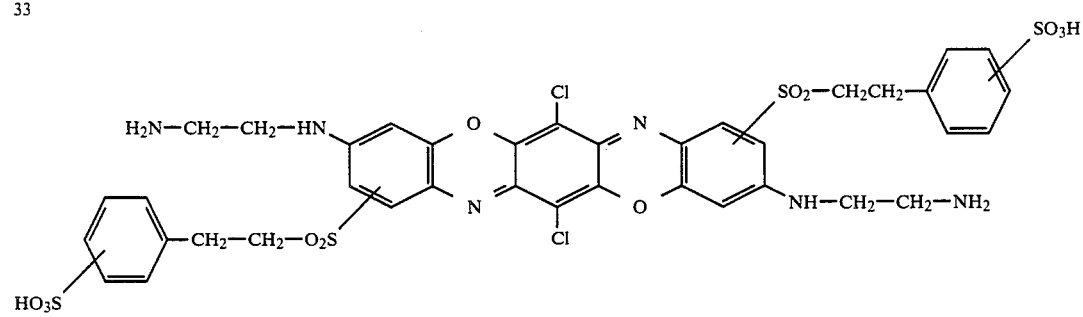
34 ″
35
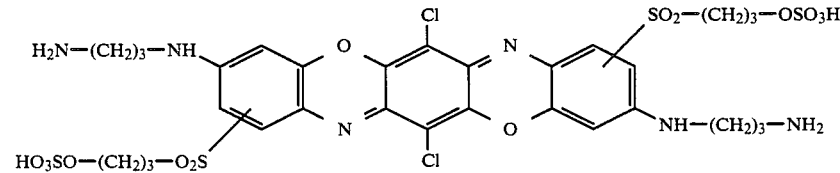

| 36 | " |
| 37 | " |
38
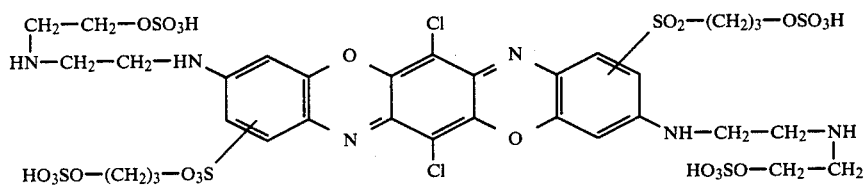
| 39 | " |
40
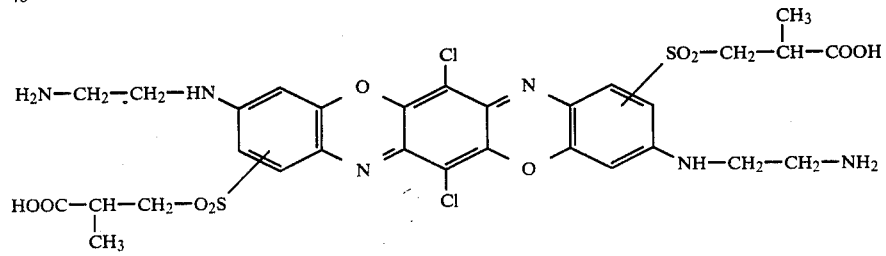
41
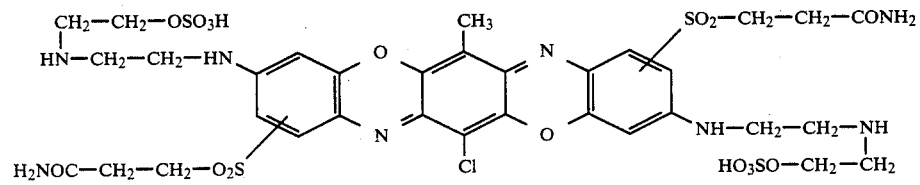
42
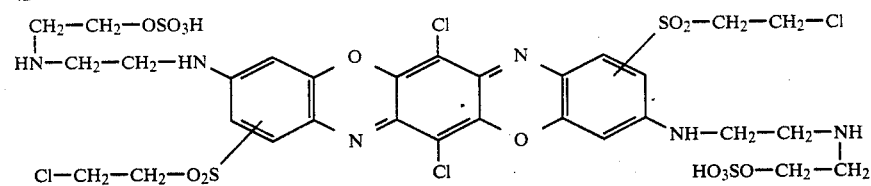
43
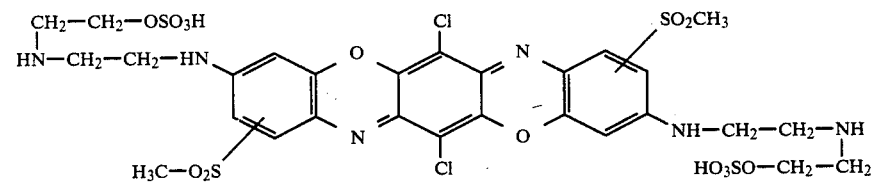
44
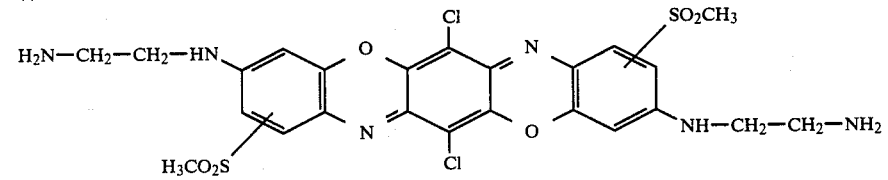
45

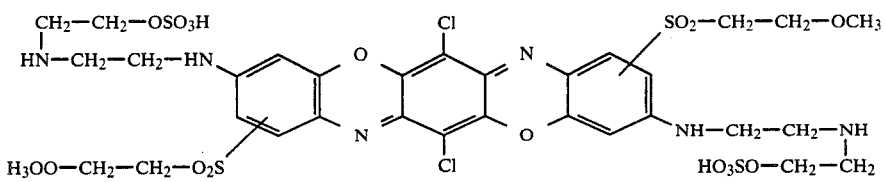
46
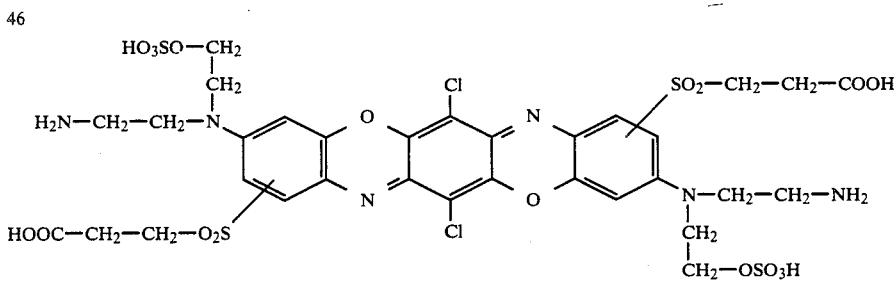
47
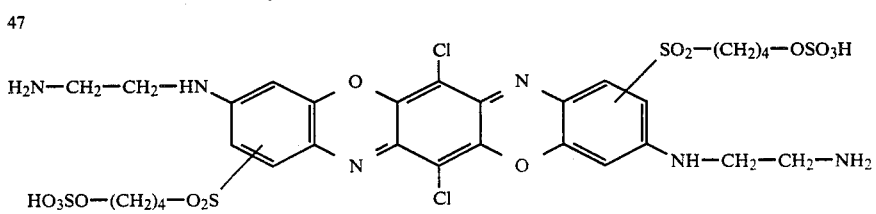
48
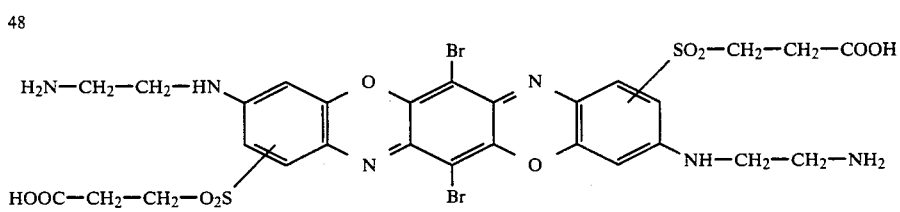
49
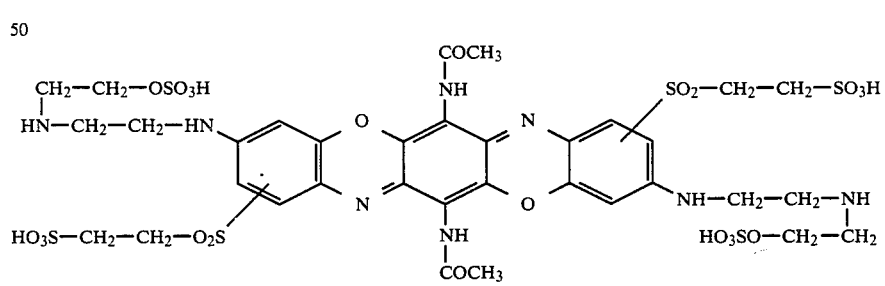
50
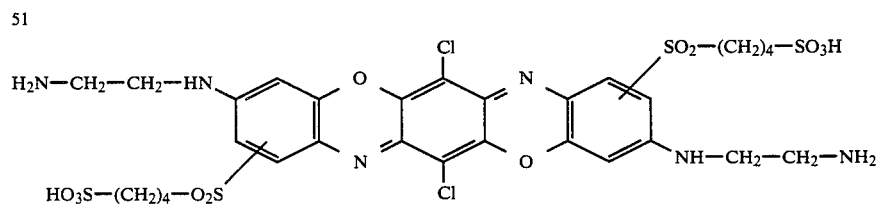
51
52

52
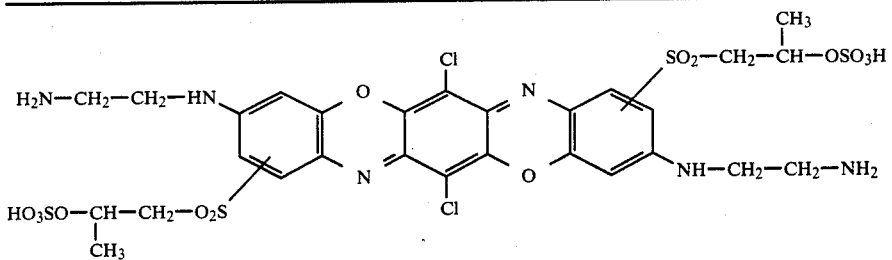
53
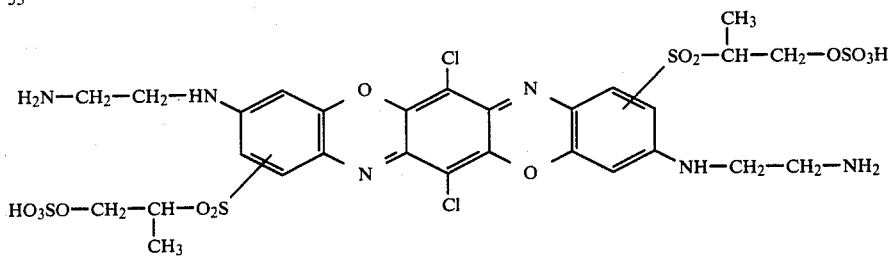
54
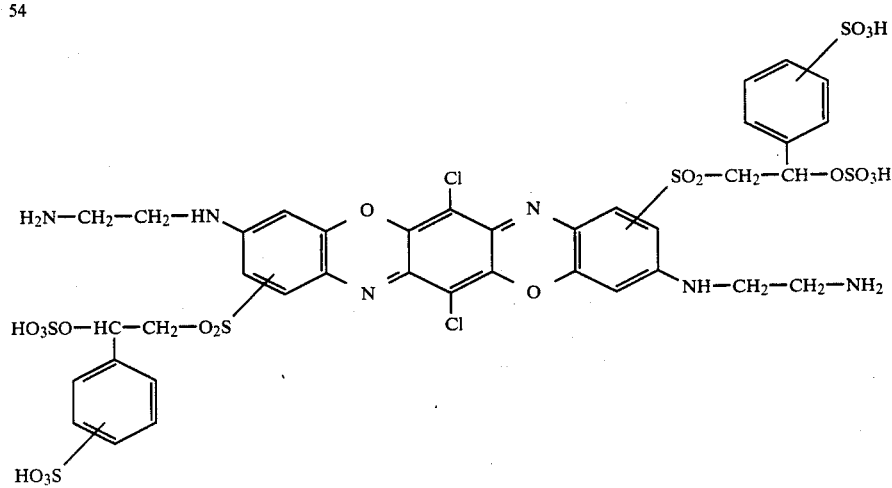
55
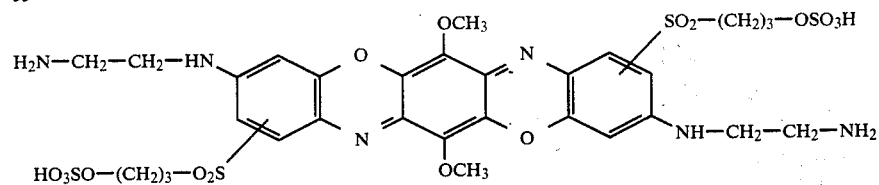
56
57
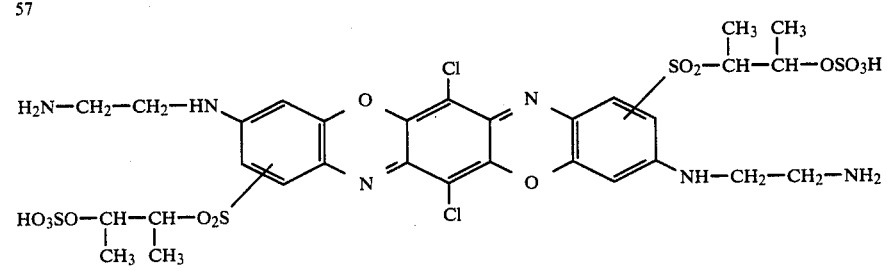
58

-continued
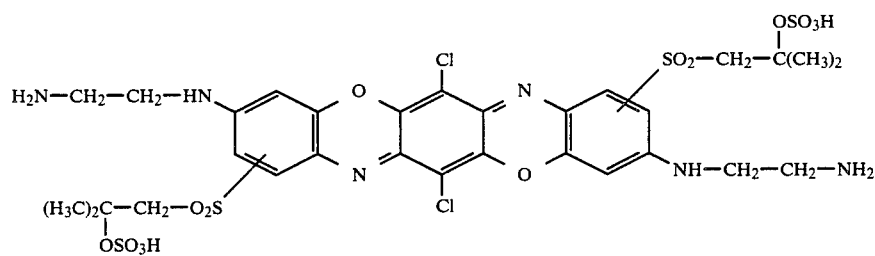
59
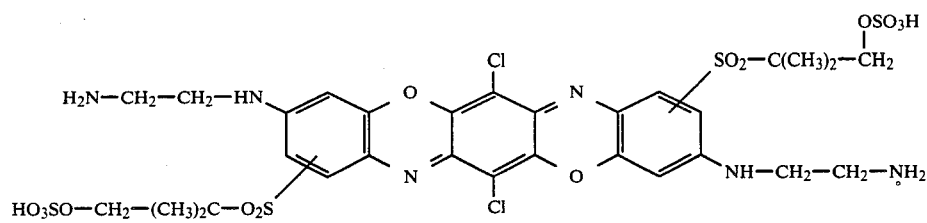
60
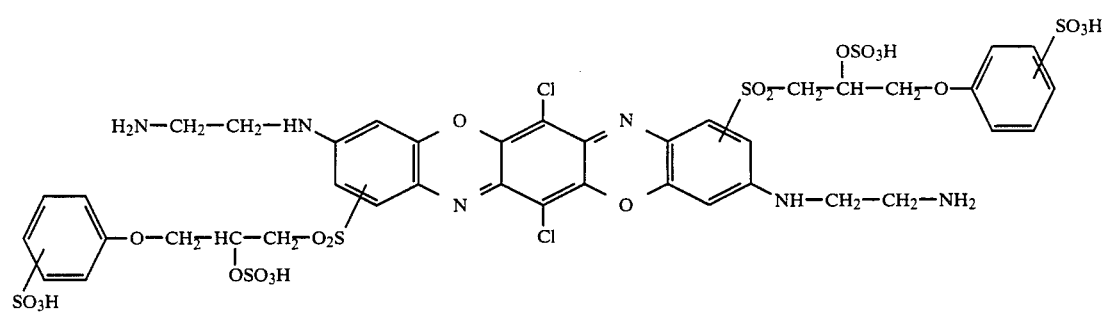
61
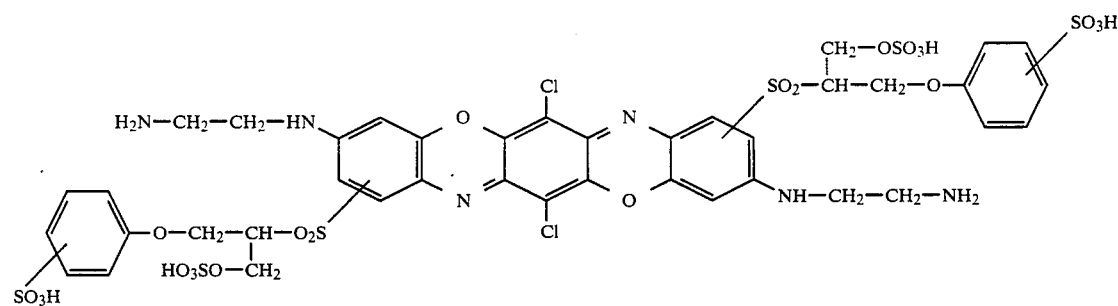
62
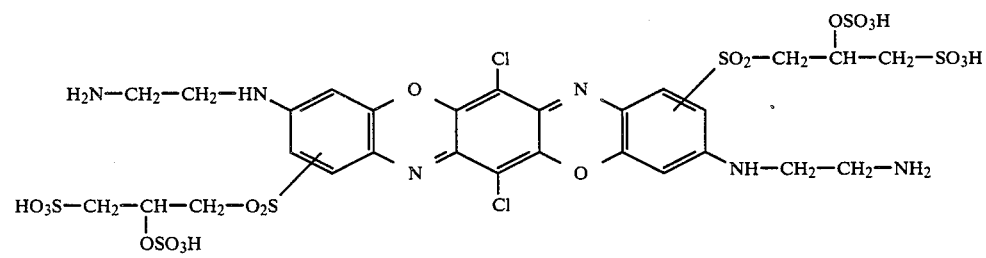
63

-continued

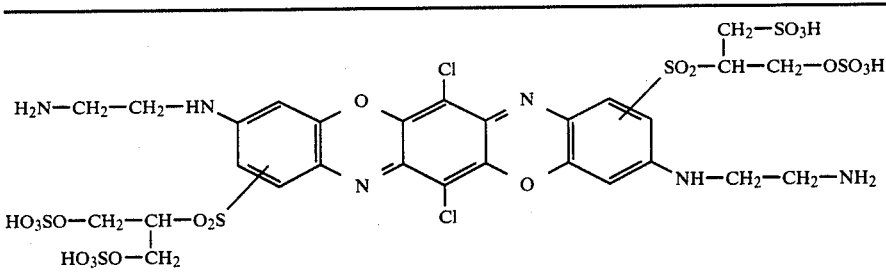

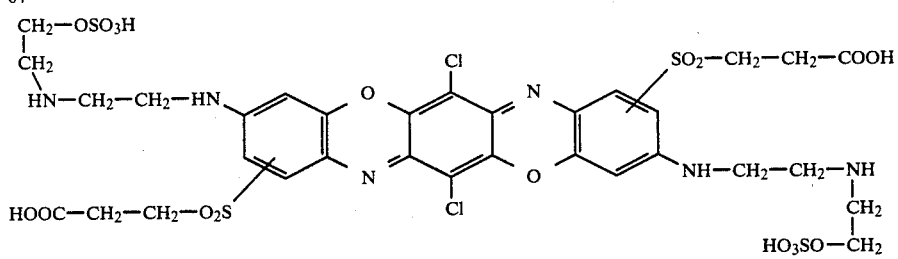

| | Aminosulphone | Quinone | Reactive component |
|---|---|---|---|
| 1 | ![structure: H2N-C6H3(SO2-(CH2)3-COOH)-NH-CH2-CH2-NH2] | ![tetrachloro-1,4-benzoquinone] | ![difluorotriazinyl-NH-benzene-2,5-disulphonic acid] |
| 2 | ![H2N-C6H3(SO2-CH2-CH2-COOH)-NH-(CH2)3-NH-CH3] | " | ![difluorotriazinyl-NH-benzene-2,4-disulphonic acid] |
| 3 | ![H2N-C6H3(SO2-CH2-CH2-COOH)-NH-(CH2)3-NH2] | " | ![difluorotriazinyl-NH-benzene-2,5-disulphonic acid] |
| 4 | " | " | ![dichlorotriazinyl-NH-benzene-2,4-disulphonic acid] |
| 5 | ![H2N-C6H3(SO2-CH2-CH2-COOH)-NH-CH2-CH2-NH-CH2-CH2OH] | " | ![dichlorotriazinyl-NH-benzene-3-sulphonic acid] |
| 6 | | | |

| | 47 | | 48 |
|---|---|---|---|
| | 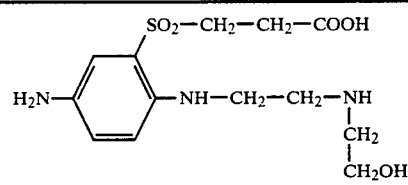 | 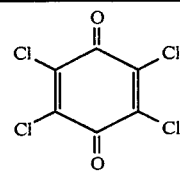 | 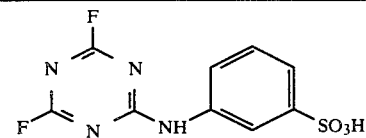 |
| 7 | " | " | 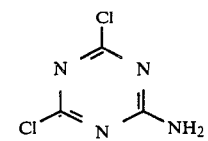 |
| 8 | " | " | 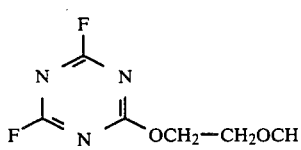 |
| 9 | 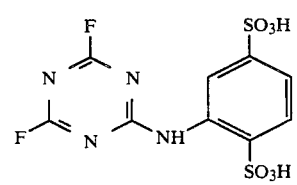 | " | 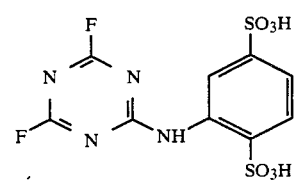 |
| 10 | | " | |
| 11 | | 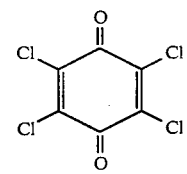 | 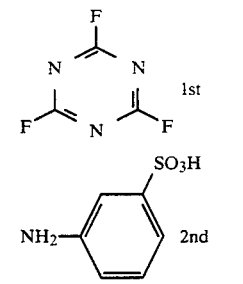 |
| 12 | | " | 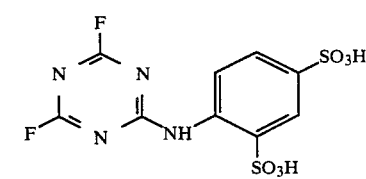 |
| 13 | | " | 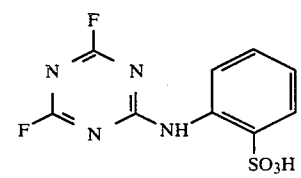 |

-continued
| 14 | " | " | 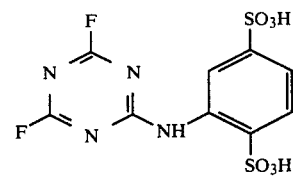 |
| 15 | 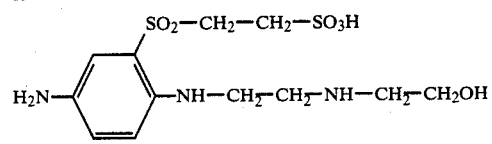 | | 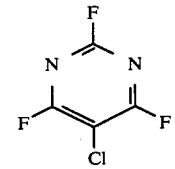 |
| 16 | 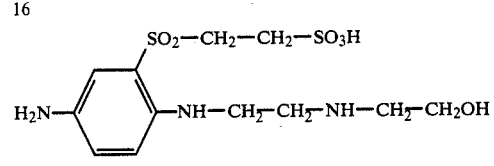 | 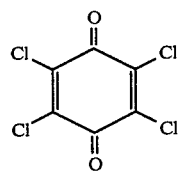 | 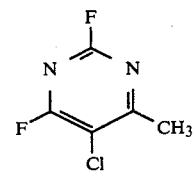 |
| 17 | 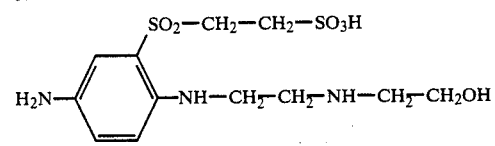 | | 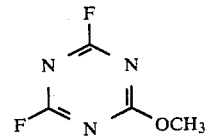 |
| 18 | " | " | 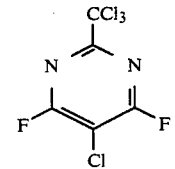 |
| 19 | 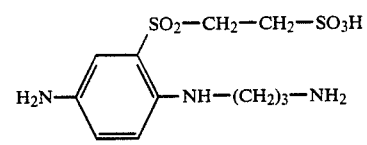 | | 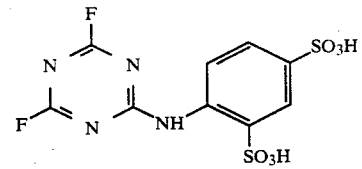 |
| 20 | 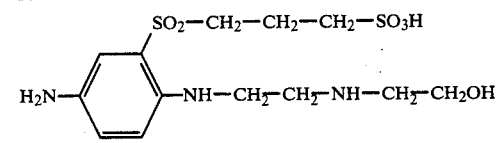 | 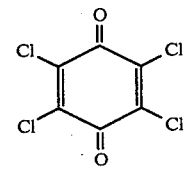 | 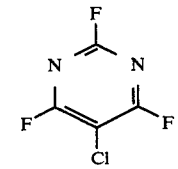 |
| 21 | " | " | 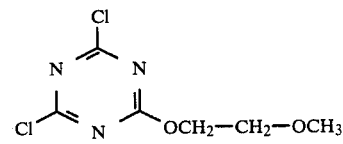 |
| 22 | | | |

| 51 | | 52 |
|---|---|---|
| | " | 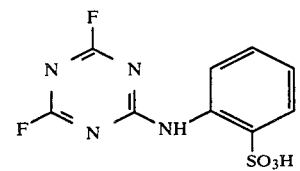 |
| 23 | 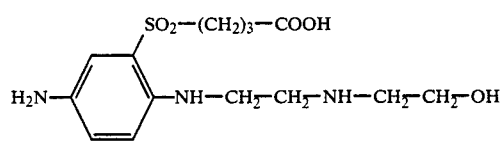 | " |
| 24 | " | 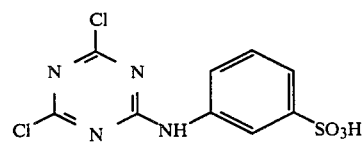 |
| 25 | 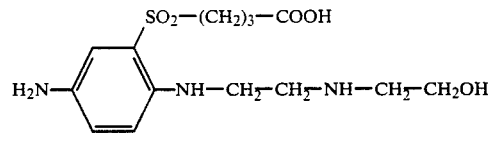 | 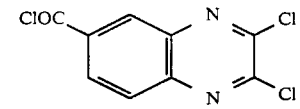 |
| | 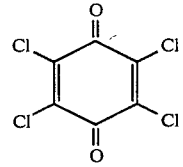 | |
| 26 | " | 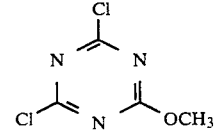 |
| 27 | 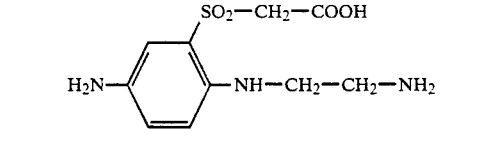 | 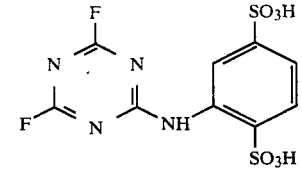 |
| 28 | 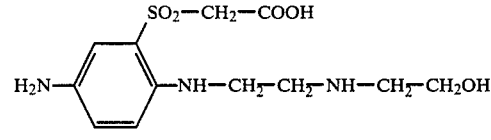 | 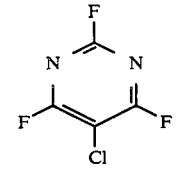 |
| 29 | " | 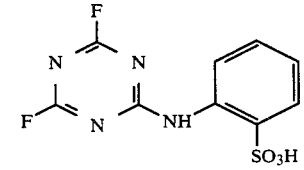 |
| 30 | | |

-continued
| | 53 | | 54 |
|---|---|---|---|
| 31 | 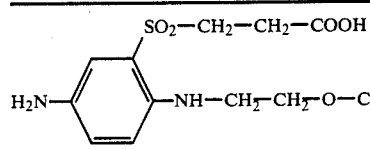 | 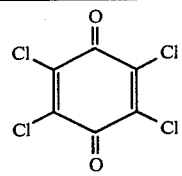 | 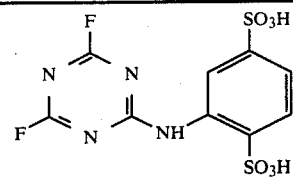 |
| 32 | 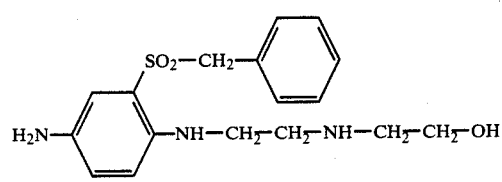 | " | 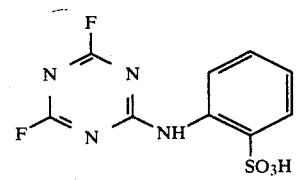 |
| 33 | | " | 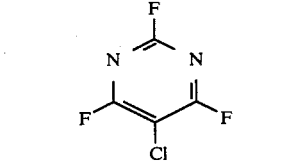 |
| 34 | 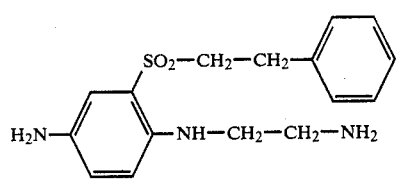 | " | 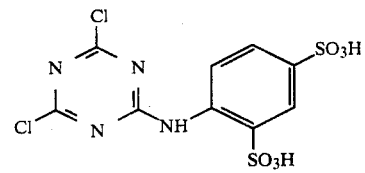 |
| 35 | | " | 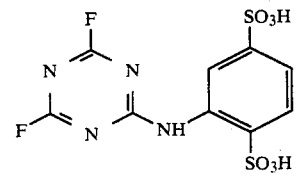 |
| 36 | 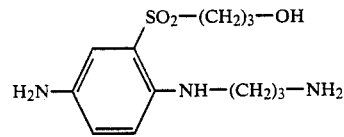 | 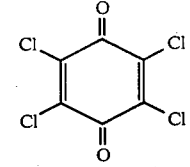 | 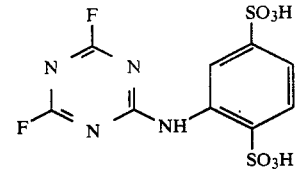 |
| 37 | | " | 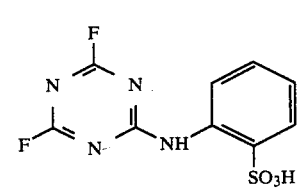 |
| 38 | | | 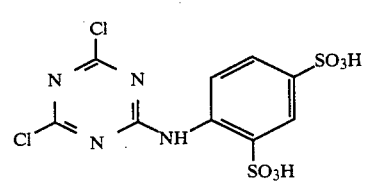 |

-continued

| | | | |
|---|---|---|---|
| 39 | H₂N—⟨phenyl with SO₂—(CH₂)₃—OH⟩—NH—CH₂—CH₂—NH—CH₂—CH₂OH | tetrachloro-1,4-benzoquinone | 2,4-difluoro-5-chloropyrimidine |
| 40 | " | " | 2,4-difluoro-1,3,5-triazin-6-yl—NH—⟨3-sulfophenyl⟩ |
| 41 | H₂N—⟨phenyl with SO₂—CH₂—CH(CH₃)—COOH⟩—NH—CH₂—CH₂—NH₂ | " | 2,4-difluoro-1,3,5-triazin-6-yl—NH—⟨2-sulfophenyl⟩ |
| 42 | H₂N—⟨phenyl with SO₂—CH₂—CH₂—CONH₂⟩—NH—CH₂—CH₂—NH—CH₂—CH₂OH | 2,3,5-trichloro-6-methyl-1,4-benzoquinone | 2,4-difluoro-1,3,5-triazin-6-yl—NH—⟨2,5-disulfophenyl⟩ |
| 43 | H₂N—⟨phenyl with SO₂—CH₂—CH₂—Cl⟩—NH—CH₂—CH₂—NH—CH₂—CH₂OH | tetrachloro-1,4-benzoquinone | 2,4-difluoro-1,3,5-triazin-6-yl—NH—⟨2-sulfophenyl⟩ |
| 44 | H₂N—⟨phenyl with SO₂—CH₂⟩—NH—CH₂—CH₂—NH—CH₂—CH₂OH | tetrachloro-1,4-benzoquinone | 2,4-difluoro-1,3,5-triazin-6-yl—NH—⟨2,5-disulfophenyl⟩ |
| 45 | H₂N—⟨phenyl with SO₂CH₃⟩—NH—CH₂—CH₂—NH₂ | " | " |
| 46 | H₂N—⟨phenyl with SO₂—CH₂—CH₂—OCH₃⟩—NH—CH₂—CH₂—NH—CH₂—CH₂OH | " | 2,4-difluoro-1,3,5-triazin-6-yl—NH—⟨2-sulfophenyl⟩ |

| | 57 | | 58 |
|---|---|---|---|
| | 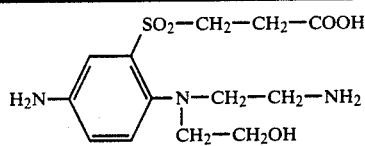 | | " |
| | | | 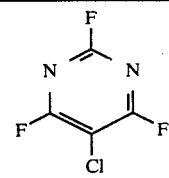 |
| 47 | 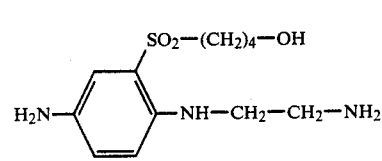 | 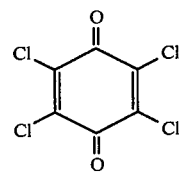 | 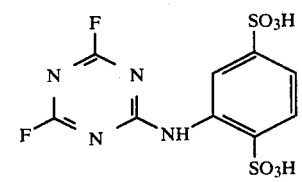 |
| 48 | | | |
| 49 | " | | |
| |  | 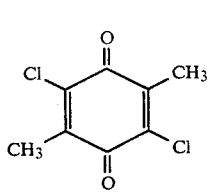 | 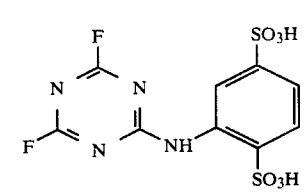 |
| 50 | 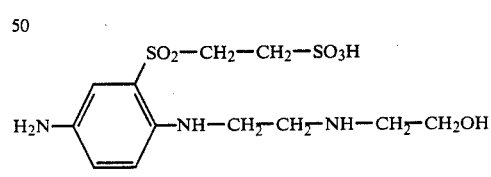 | 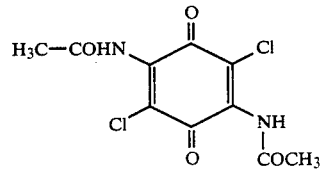 | 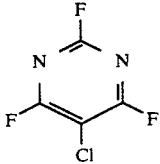 |
| 51 | 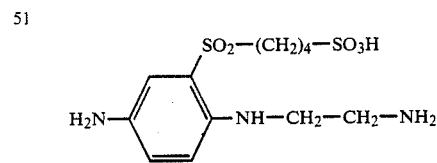 | 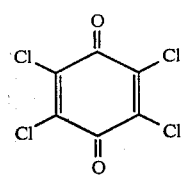 | 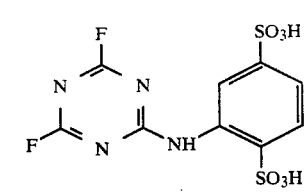 |
| 52 | 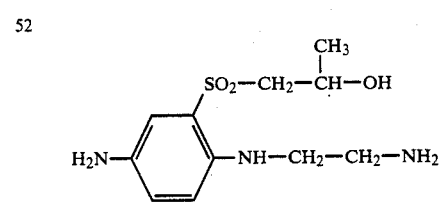 | " | 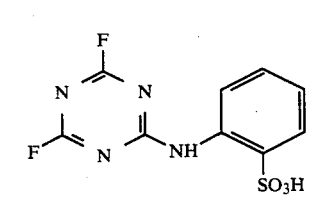 |
| 53 | 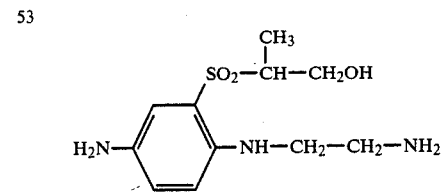 | " | 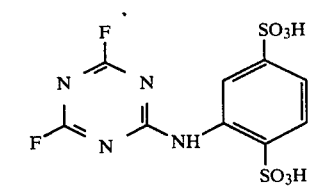 |
| 54 | | | |

| | | |
|---|---|---|
| 55 | 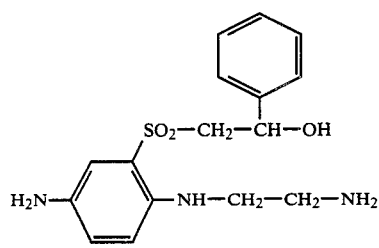 | 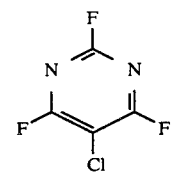 |
| 56 | 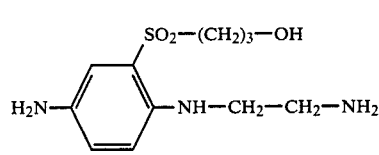 | 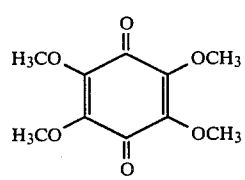 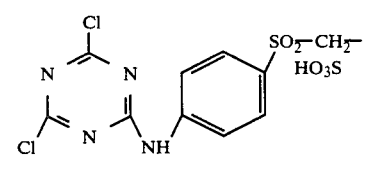 |
| 57 | | " |
| 58 | | " |
| 59 | | " |
| 60 | 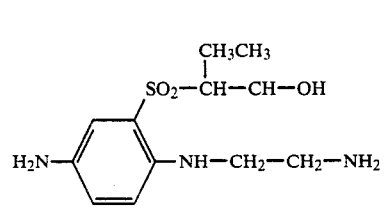 | 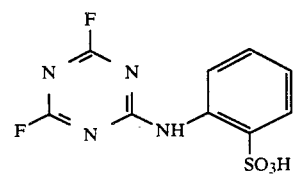 |
| 61 | 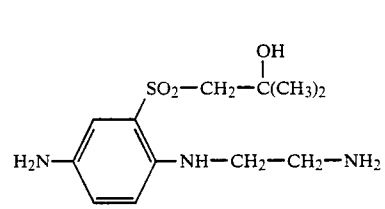 | 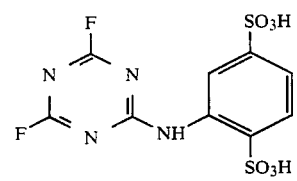 |
| | 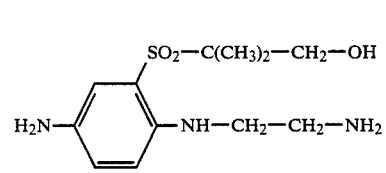 | 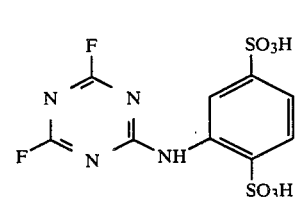 |
| | 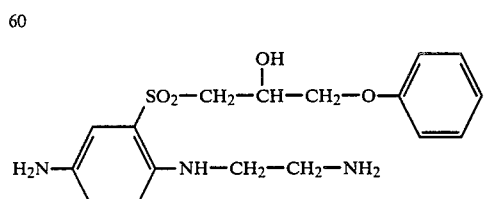 | 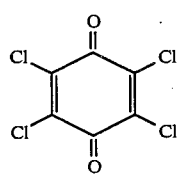 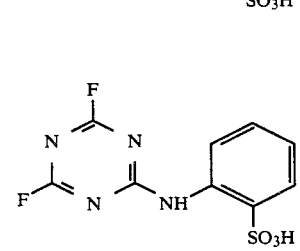 |

-continued

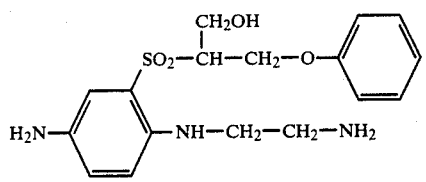

62

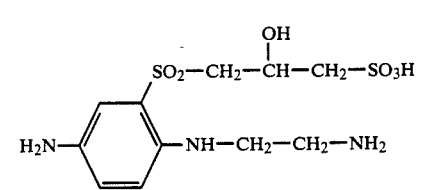

63

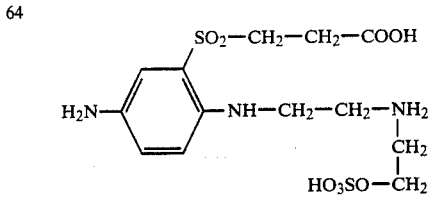

64

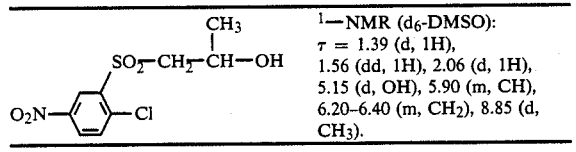

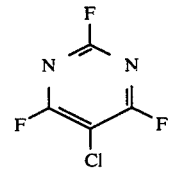

"

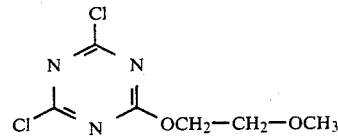

"

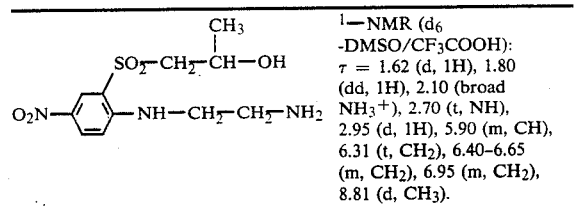

EXAMPLE 21

2-chloro-5-nitrophenyl 2-hydroxypropyl sulphone 150 g (0.5 mol) of 81% pure sodium 2-chloro-5-nitrobenzenesulphinate are presented in 300 ml of water at pH 8–8.5 and 60° C. To this are added dropwise in the couse of about 8 hours 200 ml of propylene oxide while the pH of the reaction mixture is constantly maintained between 7.5 and 9.5 with 20% strength sulphuric acid. After cooling down, the solids are filtered off with suction and washed twice with 200 ml of water. Drying at 70° C. in vacuo gives 118 g of colourless 2-chloro-5-nitrophenyl 2-hydroxypropyl sulphone.

$O_2N-\langle\rangle-Cl$ with $SO_2-CH_2-CH(CH_3)-OH$ $^1$—NMR ($d_6$-DMSO): $\tau = 1.39$ (d, 1H), 1.56 (dd, 1H), 2.06 (d, 1H), 5.15 (d, OH), 5.90 (m, CH), 6.20–6.40 (m, $CH_2$), 8.85 (d, $CH_3$).

EXAMPLE 22

2-(2-aminoethylamino)-5-nitrophenyl 2-hydroxypropyl sulphone 28 g (0.1 mol) of 2-chloro-5-nitrophenyl 2-hydroxypropyl sulphone are refluxed in 100 ml of isopropanol. To this are added gradually 15 ml of ethylenediamine, and heating is continued with stirring for a further hour. The cold reaction solution is diluted with 300 ml of water and stirred at 20° C. for two hours. The precipitated yellowish crystals are filtered off with suction, washed with 100 ml of water and dried. This gives 28 g of uniform 2-(2-aminoethylamino)-5-nitrophenyl 2-hydroxypropyl sulphone.

$O_2N-\langle\rangle-NH-CH_2-CH_2-NH_2$ with $SO_2-CH_2-CH(CH_3)-OH$ $^1$—NMR ($d_6$-DMSO/CF$_3$COOH): $\tau = 1.62$ (d, 1H), 1.80 (dd, 1H), 2.10 (broad $NH_3^+$), 2.70 (t, NH), 2.95 (d, 1H), 5.90 (m, CH), 6.31 (t, $CH_2$), 6.40–6.65 (m, $CH_2$), 6.95 (m, $CH_2$), 8.81 (d, $CH_3$).

EXAMPLE 23

[5-amino-2-(2-aminoethylamino)-phenyl]2-hydroxypropyl sulphone 26.4 g of 2-(2-aminoethylamino)-5-nitrophenyl 2-hydroxy-1-propyl sulfone are suspended in 200 ml of isopropanol. In an autoclave 1 g of Raney nickel is added to the suspension, 60–70 bar of hydrogen are injected and the temperature is raised to 60° C.

The batch is stirred some more until no further hydrogen is absorbed. After letting down the reaction mixture is diluted with 200 ml of water, the resultant solution is clarified at 60° C. from nickel, and the residue is washed with 40 ml of water. The combined filtrates are reacted as per Example 24.

An evaporated aliquot of the solution leaves a slowly crystallising viscous mass of the amine.

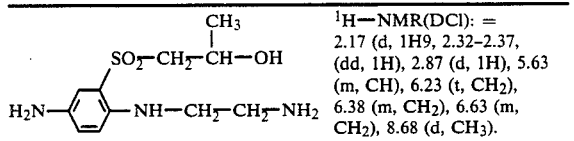

¹H—NMR(DCl): = 2.17 (d, 1H9, 2.32–2.37, (dd, 1H), 2.87 (d, 1H), 5.63 (m, CH), 6.23 (t, CH₂), 6.38 (m, CH₂), 6.63 (m, CH₂), 8.68 (d, CH₃).

of 45 minutes with cooling at such a rate that the temperature is maintained at 20° C. The reaction mixture is stirred at 20° C. for about 2 hours. It is then carefully added to 270 g of ice, the precipitated product is filtered off with suction at 0°–10° C., and the filter cake is washed with 300 ml of water until sulphate-free. The product obtained conforms to the formula

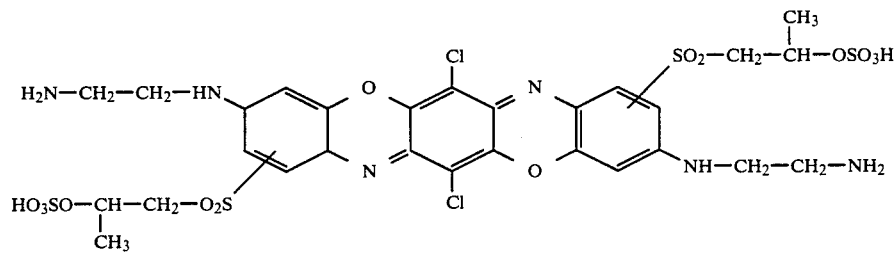

and after neutralisation gives a clear blue solution in water. The product can be dried at 50° C. in a circulating air cabinet.

EXAMPLE 24

A solution, obtained in Example 23, of 20.5 g of 5-amino-2-(2-aminoethylamino)-phenyl 2-hydroxy-1-propyl sulphone in 215 ml of water and 180 ml of isopropanol is brought to pH 6.0 with concentrated hydrochloric acid. To this are added 9.2 g of 2,3,5,6-tetrachloroquinone, the temperature is raised to 40° C., and the pH is maintained at 5.5–5.8 with 2N sodium carbonate solution. After 2 hours the temperature is raised to 50° C. and the pH is maintained some more until the consumption of sodium carbonate has ceased. To the brown solution obtained are added dropwise 550 ml of 25% strength sodium chloride solution in the course of 2 hours, the thrown precipitate is filtered off with suction, and the filter cake is washed with dilute sodium chloride solution and with acetone. This gives a brown product of the formula

EXAMPLE 26

11.2 g of the triphendioxazine component of Example 25 in the form of a moist filter cake are dissolved in 200 ml of water by setting a pH of 8.0. The bluish violet solution is immediately cooled down to 0° C. and a solution of 2-(2,4-difluorotriazinyl)-aminobenzene-1,4-disulphonic acid or of the partial sodium salt, which is prepared from 9.1 g of 2-aminobenzene-1,4-disulphonic acid and 4.9 g of cyanuric fluoride by the method of Example 12, is then added in the course of 5 minutes.

In the reaction mixture the pH is maintained at 8.0 with 2N sodium hydroxide solution and the temperature at 0°–5° C. After the reaction has ended, the solution has turned a pure blue colour. The temperature is then allowed to rise to 20° C., and the dyestuff is salted out of the solution with potassium chloride. The precipitate is filtered off with suction, and the filter cake is washed with 20% strength potassium chloride solution and after addition of a little phosphate buffer solution is dried at 45° C. in vacuo. This gives a dyestuff of the formula

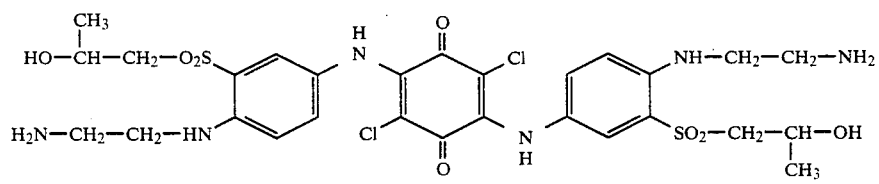

EXAMPLE 25

11.9 g of the condensation product obtained in Example 24 are gradually added at −5° to 0° C. to 50 ml of 20% strength oleum. After the addition, the temperature of the solution is allowed to rise to 15° C., and 7.7 g of potassium peroxodisulphate are added in the course

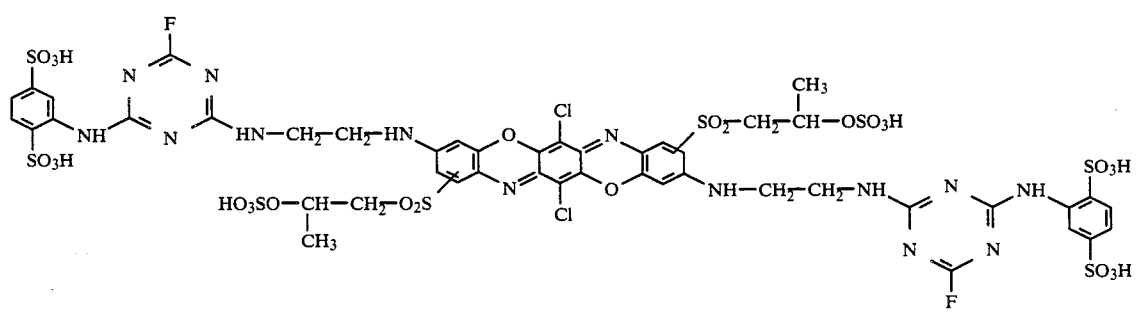

which dyes cellulose fibres from a long liquor in bright blue shades. C.I. indicator number 13. $\rho_{max}=616$ nm in water.

We claim:
1. A dyestuff of the formula

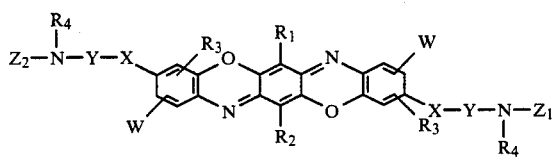

wherein
$R_1$ $R_2$=H, Cl, Br, $C_1$-$C_4$-alkyl, aryl, $C_1$-$C_4$-alkoxy, aryloxy, acylamino, carboxyl or carboxamide,
$R_3$=H, $C_1$-$C_4$-alkyl, Cl, Br, $C_1$-$C_4$-alkoxy, sulpho or carboxyl,
$R_4$=H or optionally $SO_3H$—, $OSO_3H$, COOH—, $OPO_3H_2$— or OH substituted $C_1$-$C_4$-alkyl, cyclohexyl, phenyl or sulphophenyl,
X=

or O
$R_5$=H, $C_1$-$C_6$-alkyl, cycloalkyl, aryl or aralkyl,
Y=bridge member, $Z_1$, $Z_2$=H or fibre-reactive radical
W=non-fibre-reactive sulphonyl radical.

2. A dyestuff according to claim 1 where
W=non-fibre-reactive alkyl-, aralkyl-, cycloalkyl- or aryl-sulphonyl radical.

3. A dyestuff according to claim 1 where
W=$SO_2Q$ wherein
Q=$C_2$-alkyl, optionally substituted by $SO_3H$, COOH, carboxamide, sulphonamide or $C_1$-$C_4$-alkoxy; $C_1$-alkyl or $C_3$-$C_6$-alkyl, cycloalkyl, aralkyl or aryl all of which can be optionally substituted by $SO_3H$, $OSO_3H$, S—$SO_3H$, COOH, carboxamide, —COO$C_1$-$C_4$-alkyl, CN, —$PO_3H_2$, —O-$PO_3H_2$, O—CO—$C_1$-$C_4$-alkyl, OH, $C_1$-$C_4$-alkoxy, —(CH$_2$—CH$_2$—O)$_{1-4}$—CH$_2$—CH$_2$OH, —(CH$_2$—CH$_2$—O)$_{1-4}$—CH$_2$—CH$_2$—OSO$_3$H, sulphophenoxy or halogen.

4. A dyestuff of the formula

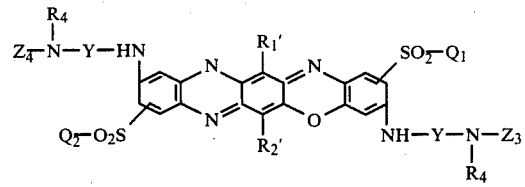

wherein
$Z_3$, $Z_4$=heterocyclic fibre-reactive radical
$R'_1$, $R'_2$=Cl, Br, $CH_3$ or H
$Q_1$=sulpho-$C_1$-$C_6$-alkyl, sulphato-$C_3$-$C_6$-alkyl, sulphophenyl-$C_1$-$C_4$-alkyl or carboxy-$C_1$-$C_6$-alkyl.

5. A dyestuff according to claim 4 of the formula

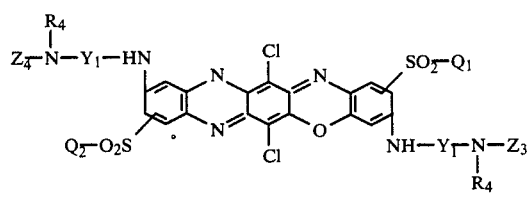

wherein
$Y_1$=$C_2$-$C_6$-alkyl or cyclohexylene
$Q_1$=sulpho-$C_1$-$C_6$-alkyl, sulphato-$C_3$-$C_6$-alkyl, sulfo-phenyl-$C_1$-$C_4$-alkyl or carbonyl-$C_1$-$C_6$-alkyl.

6. A dyestuffs according to claim 4 of the formula

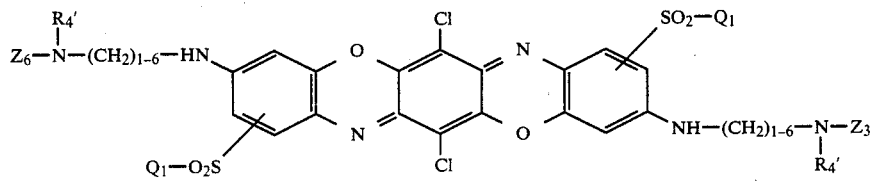

wherein
$R_{4'}$=H, $CH_2$—$CH_2$—$OSO_3H$, $CH_2$—$CH_2$—OH
$Z_5$, $Z_6$=halogenotriazinyl or halogenopyrimidinyl radical.

7. A dyestuff according to claim 1 wherein
$R_1$, $R_2$=H, Cl, Br, $C_1$-$C_4$-alkyl or $C_1$-$C_4$-alkoxy,
$R_3$=H, Cl, Br, $C_1$-$C_4$-alkyl, $C_1$-$C_4$-alkoxy, sulpho or carboxy,
$R_4$=H, $C_1$-$C_4$-alkyl optionally substituted by $SO_3H$, $OSO_3H$, COOH, $OPO_3H_2$ or OH, cyclohexyl, phenyl or sulphophenyl,
$R_5$=H or $C_1$-$C_6$-alkyl.

8. A dyestuff according to claim 3, wherein
Q =$C_2$-alkyl opt. substituted by $SO_3H$, COOH, carboxamide, sulfonamide or $C_1$-$C_4$-alkoxy; $C_1$-alkyl or $C_3$-$C_6$-alkyl both opt. substituted by $SO_3H$, $OSO_3H$, $SSO_3H$, carboxy, OH, $C_1$-$C_4$-alkoxy, $OPO_3H_2$, $PO_3H_2$, CN, +CH$_2$CH$_2$O+Hd 1-4CH$_2$CH$_2$OH, +CH$_2$CH$_2$O+$_{1-4}$CH$_2$CH$_2$OSO$_3$H, sulphophenoxy or halogen; cycloalkyl; phenyl and phenyl-$C_1$-$C_4$-alkyl both opt. substituted by $SO_3H$, $OSO_3H$, $SSO_3H$, COOH, carboxamide, CN, $PO_3H_2$, $OPO_3H_2$, OH, $C_1$-$C_4$-alkoxy or halogen.

* * * * *

UNITED STATES PATENT AND TRADEMARK OFFICE
CERTIFICATE OF CORRECTION

PATENT NO. : 4,665,179

DATED : May 12, 1987

INVENTOR(S) : Klaus Wunderlich, et al.

It is certified that error appears in the above-identified patent and that said Letters Patent is hereby corrected as shown below:

| | |
|---|---|
| Col. 1, line 10 | First structure and last structure delete "$R_5$" and substitute --$R_3$-- |
| Col. 8, line 50 | End of formula delete " 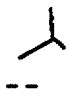 " and substitute --  -- |
| Col. 10, lines 10, 25, 31, 37 | After "4" insert -- - -- |
| Col. 10, line 12 | After "4" first instance insert -- - -- |
| Col. 10, lines 10, 17, 55 | After "5" insert -- - -- |
| Col. 10, line 12 | After "5" first instance insert -- - -- |
| Col. 10, line 14 | After "6" first instance insert -- - -- |
| Col. 10, line 38 | Correct spelling of --trifluoromethyl-- |
| Col. 10, line 47 | After "6" insert -- - -- |
| Col. 12, lines 8-9 | Delete "and -CO-CCL-CH-$CH_3$" and substitute -- -CO-CH=CCl-COOH-- |
| Col. 12, line 19 | Correct spelling of --sulphonyl-acryloyl-- |
| Col. 18, line 11 | Delete "give" and substitute --gives-- |
| Col. 18, line 57 | Delete "aminoophenylsulphonyl" and substitute --amino-phenylsulphonyl-- |
| Col. 23, line 29 | Delete "cource" and substitute --course-- |
| Col. 23, line 50 | Delete "in" and substitute --of-- |
| Col. 25, lines 40-41 | Correct spelling of --tetrachloroquinone-- |

UNITED STATES PATENT AND TRADEMARK OFFICE
CERTIFICATE OF CORRECTION

PATENT NO. : 4,665,179

DATED : May 12, 1987

INVENTOR(S) : Klaus Wunderlich, et al.

It is certified that error appears in the above-identified patent and that said Letters Patent is hereby corrected as shown below:

| | |
|---|---|
| Col. 26, line 48 | Correct spelling of --suction-- |
| Col. 27, line 1 | Middle of formula delete "$CH_2$--$O_2S$" and substitute --$CH_2$-$O_2S$-- |
| Col. 27, line 61 | Delete "200 ml" and substitute --120 ml-- |
| Col. 37, Compound 38 | Beginning of formula delete "$O_3S$" and substitute --$O_2S$-- |
| Col. 39, Compound 46 | Beginning of formula delete "-$O_2S$" and substitute --$SO_2$-- |
| Col. 45, Compound 63 | Beginning of formula delete "$HO_3SO$-" and substitute --$HO_3S$- -- |
| Col. 55, Compound 43 | Beginning of formula delete "-$CH_2$" and substitute -- -$CH_3$-- |
| Col. 61, line 42 | Correct spelling of --course-- |
| Col. 62, line 54 | Before "5" delete "["; after "phenyl" delete "]" |
| Col. 63, line 2 | After "1H" delete "9" and substitute --)-- |
| Col. 66, lines 6, 23 | Beginning of formula delete "$Q_2$" and substitute --$Q_1$-- |

UNITED STATES PATENT AND TRADEMARK OFFICE
CERTIFICATE OF CORRECTION

PATENT NO. : 4,665,179

DATED : May 12, 1987

INVENTOR(S) : Klaus Wunderlich, et al.

It is certified that error appears in the above-identified patent and that said Letters Patent is hereby corrected as shown below:

Col. 66, line 30      Delete "dyestuffs" and substitute --dyestuff--

Col. 66, lines 57-58  Delete "Hd 1-4" and substitute -- 1-4 --

Signed and Sealed this

Twenty-sixth Day of January, 1988

Attest:

DONALD J. QUIGG

*Attesting Officer*      *Commissioner of Patents and Trademarks*